United States Patent
Okazaki et al.

(10) Patent No.: US 6,923,492 B2
(45) Date of Patent: Aug. 2, 2005

(54) IMPACT ABSORBING STRUCTURE FOR A VEHICLE SIDE DOOR

(75) Inventors: Yuji Okazaki, Fuchu-cho (JP); Shoji Okano, Fuchu-cho (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/685,519

(22) Filed: Oct. 16, 2003

(65) Prior Publication Data

US 2004/0080179 A1 Apr. 29, 2004

(30) Foreign Application Priority Data

Oct. 17, 2002 (JP) ........................................ 2002-302621

(51) Int. Cl.[7] ............................................. B60R 27/00
(52) U.S. Cl. ................................ 296/146.6; 296/146.7; 296/187.05
(58) Field of Search ................................. 296/147, 151, 296/146.5, 146.6, 146.7, 187.01, 187.03, 187.04, 187.05, 187.12; 49/502; 293/126, 128, 132, 133

(56) References Cited

U.S. PATENT DOCUMENTS

| | | | | |
|---|---|---|---|---|
| 4,958,883 A | * | 9/1990 | Iwaki et al. | 296/152 |
| 5,447,326 A | * | 9/1995 | Laske et al. | 280/728.3 |
| 5,720,510 A | * | 2/1998 | Daniel et al. | 296/187.05 |
| 5,820,191 A | * | 10/1998 | Blakewood et al. | 296/37.13 |
| 5,936,818 A | * | 8/1999 | Maue et al. | 361/93.1 |
| 6,158,767 A | * | 12/2000 | Sinnhuber | 280/730.2 |
| 6,248,200 B1 | * | 6/2001 | Dailey et al. | 156/245 |
| 6,286,889 B1 | * | 9/2001 | Kim | 296/146.7 |
| 6,332,641 B1 | * | 12/2001 | Okana | 296/146.6 |
| 6,340,203 B2 | * | 1/2002 | Enomoto et al. | 296/203.02 |
| 6,481,775 B2 | * | 11/2002 | Brocklehurst | 296/39.1 |
| 6,659,537 B2 | * | 12/2003 | Moriyama et al. | 296/146.6 |
| 6,733,064 B2 | * | 5/2004 | Fox et al. | 296/68.1 |
| 6,779,830 B2 | * | 8/2004 | Patberg et al. | 296/146.6 |
| 6,779,831 B2 | * | 8/2004 | Moriyama | 296/146.9 |
| 2004/0026957 A1 | * | 2/2004 | Bodin et al. | 296/146.6 |

FOREIGN PATENT DOCUMENTS

| | | |
|---|---|---|
| EP | 1 068 970 A1 | 1/2001 |
| JP | 08-67213 | 3/1996 |
| JP | 2001-138864 | 5/2001 |

OTHER PUBLICATIONS

Patent Abstract of Japan vol. 1998, No. 09, Jul. 31, 1998 & JP 10 109662 A (Mitsubishi Motors Corp.) Apr. 28, 1998 *ABSTRACT*.

Patent Abstracts of Japan vol. 2002, No. 08, Aug. 5, 2002 & Aug. 5, 2002 & JP 2002 103975 A (Mazda Motor Corp), Apr. 9, 2002 *ABSTRACT*.

European Search Report Dated Feb. 17, 2004.

* cited by examiner

*Primary Examiner*—H. Gutman
(74) *Attorney, Agent, or Firm*—Nixon Peabody LLP; Donald R. Studebaker

(57) ABSTRACT

An impact absorbing structure for a vehicle side door which opens and closes an opening formed in a side part of a vehicle, the side door including: a door main body which has a door inner panel and a door outer panel joined to the door inner panel; and a door sash portion which extends upward from the door main body and supports a door window member, in which: a sash-side door trim which covers the door sash portion is provided in the door sash portion on the inside of a vehicle cabin; and an impact absorbing portion which absorbs an impact load when an occupant comes into contact with the sash-side door trim from the inside of the vehicle cabin is provided in a front longitudinal-side part of the sash-side door trim.

8 Claims, 20 Drawing Sheets

IMPACT ABSORBING STRUCTURE FOR A VEHICLE SIDE DOOR

BACKGROUND OF THE INVENTION

1. Field of the Invention

This invention relates to an impact absorbing structure for a vehicle side door which opens and closes a door opening formed in a side part of a vehicle to allow a person to get into and out of the vehicle.

2. Description of the Related Art

As a vehicle side-door structure, the following is known conventionally. According to that, a continuous door opening with no partition is formed in a side part of a vehicle body, and a front door and a rear door cover the door opening so that it can be opened and closed. Then, the front door is pivotally attached on a front-door hinge at its front part to the vehicle body, the rear door is pivotally attached on a rear-door hinge at its rear part to the vehicle body. Next, a side door made up of the front door and the rear door is configured so as to have what is called a double-leafed hinged door structure. In addition, the rear-end part of the front door overlaps with the outside of the front-end part of the rear door, and a reinforcement member which extends in the up-and-down directions is provided on the inside of the front-end part of the rear door (for example, refer to Japanese Patent Laid-Open No. 2001-138864 specification).

As a vehicle impact-absorbing structure, there is such a constitution as follows. According to that, a pillar trim is attached to a center pillar on the inside of a vehicle cabin, and inside this pillar trim, a rib structure body is united to the pillar trim. Thereby, if the head of a front-seat occupant comes into contact with the rib structure body from the inside of the vehicle cabin when the vehicle is bumped at its side part, the rib structure body is buckled to absorb an impact load (for example, refer to Japanese Patent Laid-Open No. 8-67213 specification).

In what is called a double-leafed hinged door in which a front door and a rear door cover a continuous opening with no partition so that the opening can be opened and closed, there is no center pillar. It has been difficult to apply the impact absorbing structure to a double-leafed hinged door with no center pillar.

Therefore, in such a double-leafed hinged door, the absorption of an impact on an occupant, specifically on the head of a front-seat occupant, needs to be established.

It is an object of the present invention to provide an impact absorbing structure for a vehicle side door which is capable of securing the absorption of an impact on an occupant to keep the occupant safer and making the structure simpler. In order to attain the object, in a side door including a door main body and a door sash portion, a sash-side door trim is provided in the door sash portion on the inside of a vehicle cabin, and an impact absorbing portion which absorbs an impact load when an occupant comes into contact therewith from the inside of the vehicle cabin is provided in a front longitudinal-side part of the sash-side door trim.

SUMMARY OF THE INVENTION

An impact absorbing structure for a vehicle side door according to the present invention, the side door opening and closing an opening formed in a side part of a vehicle and including: a door main body which has a door inner panel and a door outer panel joined to said door inner panel; and a door sash portion which extends upward from said door main body and supports a door window member, wherein: a sash-side door trim which covers said door sash portion is provided in the door sash portion on the inside of a vehicle cabin; and an impact absorbing portion which absorbs an impact load when an occupant comes into contact with said sash-side door trim from the inside of the vehicle cabin is provided in a front longitudinal-side part of the sash-side door trim.

The side door having the above described configuration may also be a rear door, and the impact absorbing portion may also be formed by a rib which is disposed inside the front longitudinal-side part.

According to the above described configuration, the impact absorbing portion is provided in the front longitudinal-side part of the sash-side door trim. Thereby, if an occupant comes into contact with the sash-side door trim from the inside of the vehicle cabin when the vehicle is bumped at its side part, the absorption of an impact on the occupant can be secured, keeping the occupant safer. In addition, the impact absorbing portion which absorbs an impact load is provided in the sash-side door trim, allowing the structure to become simpler.

These and other objects, features and advantages of the present invention will become more apparent upon reading of the following detailed description along with the accompanied drawings.

DETAILED DESCRIPTION OF INVENTION

Hereinafter, the impact absorbing structure for the vehicle side door according to an embodiment of the present invention will be described in detail with reference to the accompanied drawings.

Figure 1:
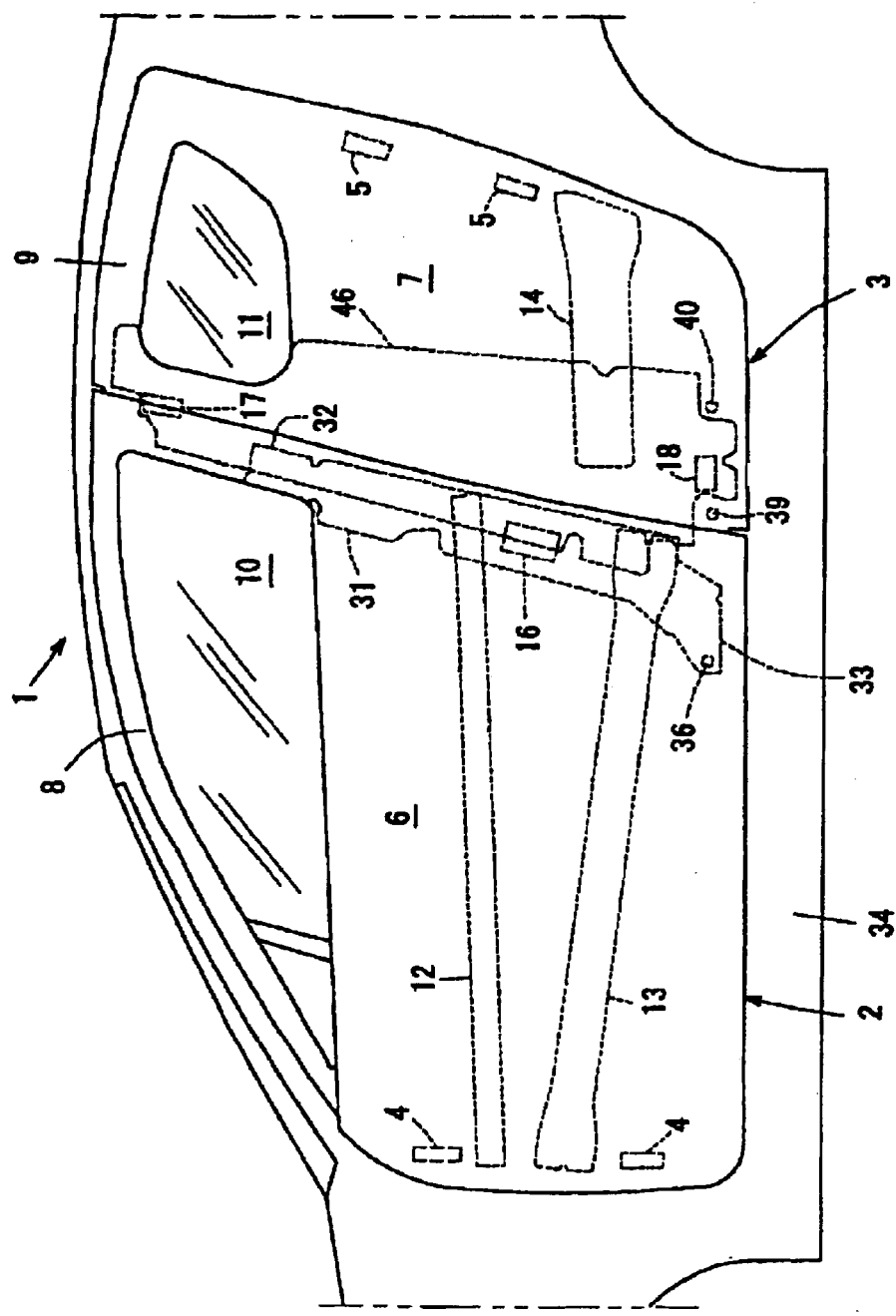
FIG. 1 is a side view showing a vehicle side door having an impact absorbing structure according to the present invention.

Those drawings show the impact absorbing structure for the vehicle side door. However, the vehicle side-door structure will be described at first. FIG. 1 shows a side door of a vehicle, seen from the outside, which has a freestyle structure (or a double-leafed hinged structure). In FIG. 1, a side door configured by a front door 2 and a rear door 3 is provided on the vehicle-body side of a vehicle 1. In the front-end part of the front door 2 and the rear-end part of the rear door 3, a front-door hinge 4 and a rear-door hinge 5 are provided as a hinge portion, respectively. Each door hinge 4, 5 includes a door-side hinge bracket, a hinge pin and a body-side hinge bracket.

The front door 2 is pivotally attached on the front-door hinges 4, 4 to a hinge pillar used as a vehicle-body rigid member, so that it can be opened and closed. The rear door 3 is pivotally attached on the rear-door hinges 5, 5 to a rear body, so that it can be opened and closed. Both the front door 2 and the rear door 3 cover a continuous door opening portion 15 (see FIG. 11) with no partition, or a door opening portion with no center pillar, in a side part of the vehicle so that the opening is opened and closed.

The front door 2 and the rear door 3, which configures the side door, includes door main bodies 6, 7, door sash portions 8, 9 which extend upward from the door main bodies 6, 7 and support door window members (refer to a window glass 10 and a flip window member 11), and a window glass 10 (but, also including a resin-made member) and a flip window member 11, respectively. Inside the door main bodies 6, 7, impact bars 12, 13 and a lateral impact bar 14 are provided which extends in the front-and-rear directions of the vehicle, respectively.

In the door having a double-leafed hinged door structure according to this embodiment, the front door 2 is opened ahead of the rear door 3. In other words, the rear door 3 cannot be opened unless the front door 2 is opened.

Figure 11:
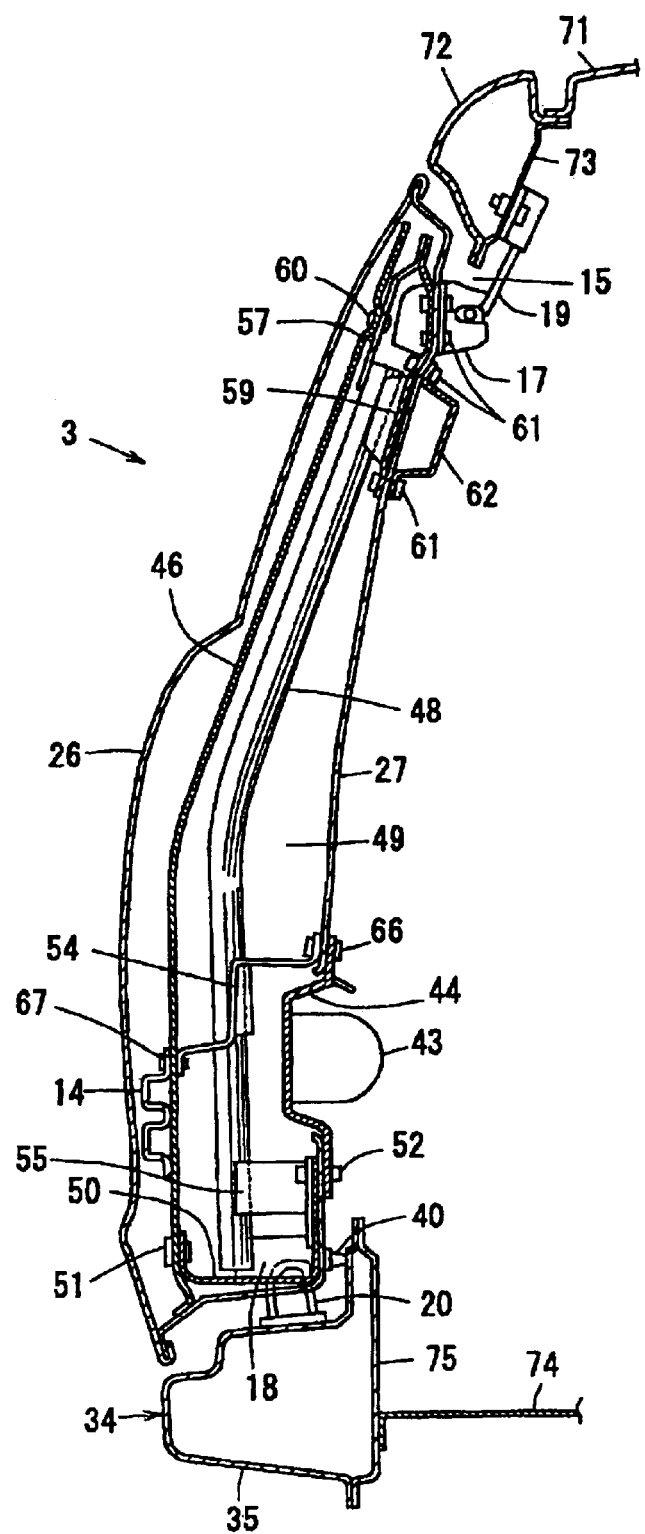
FIG. 11 is a sectional view showing the rear door, seen along a G—G line in FIG. 10.

Each of the doors 2, 3 opens and closes the door opening portion 15 (see FIG. 11). As shown in FIG. 1, a door latch 16 which can be hooked to and unhooked from the rear door 3 is provided at a rear-end part of the front door 2. The door latch 16 is locked by a striker provided at a front-end part of the rear door 3. At upper and lower parts of the front-end part of the rear door 3, door latches 17, 18 are provided which can be hooked to and unhooked from a vehicle body. These door latches 17, 18 are locked by strikers 19, 20 on the body side (mentioned later with reference to FIG. 11), respectively. Herein, the strikers 19, 20 are disposed at an upper-side part and at a lower-side part of the door opening portion 15 with no center pillar (see FIG. 11), respectively.

Figure 2:
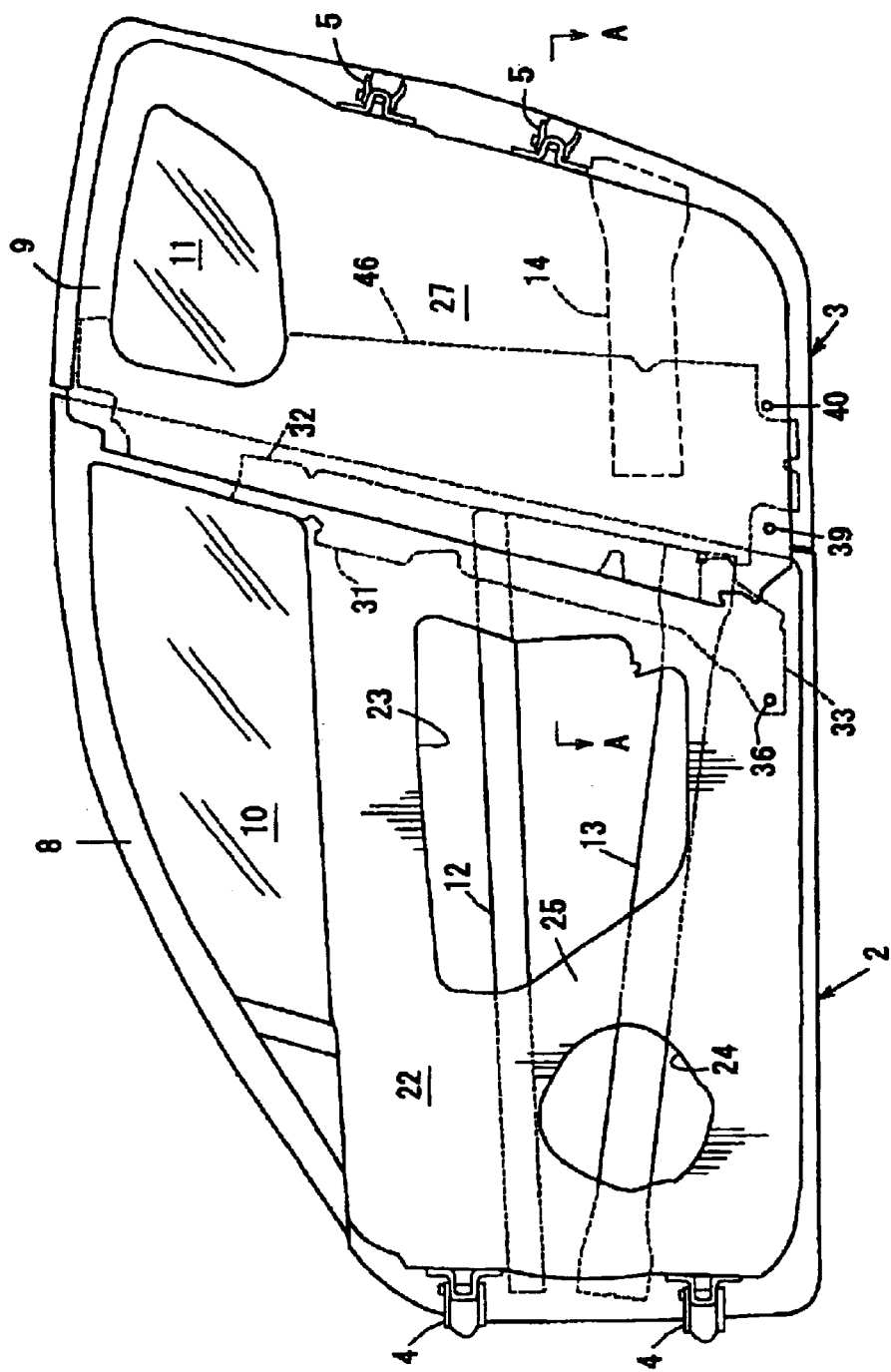
FIG. 2 is a side view showing the side door, seen from the inside of a vehicle cabin.
Figure 3:
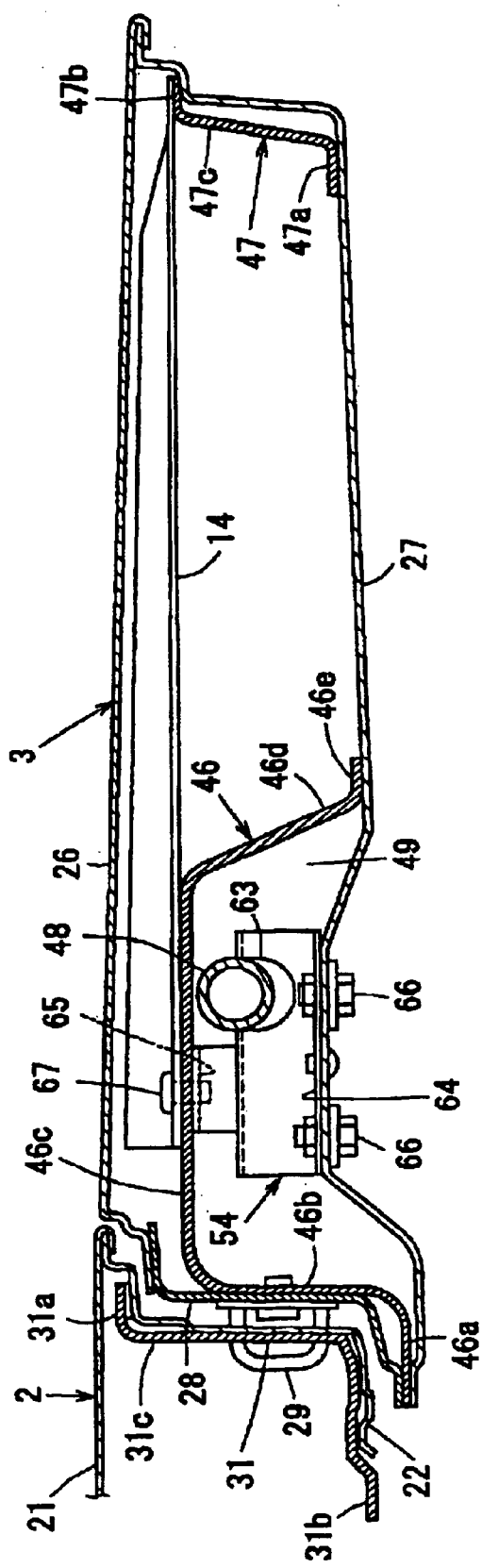
FIG. 3 is a sectional view showing the side door, seen along an A—A line in FIG. 2.

FIG. 2 is a side view showing the side door on the right-hand side, seen from the inside of a vehicle cabin. FIG. 3 is a partial sectional view showing the side-door structure, seen along an A—A line in FIG. 2. When the front door 2 and the rear door 3 are close, as shown in FIG. 3, the rear part of the front door 2 overlaps over a predetermined area with the front-part outside of the rear door 3.

The front door 2 includes a door outer panel 21 and a door inner panel 22. As shown in FIG. 2, two opening portions 23, 24 and a partition portion 25 are formed in the door inner panel 22. The partition portion 25 is located between the opening portions 23, 24 and extends in an oblique direction or in an inclining direction from the upper front to the lower rear.

The rear door 3 includes door outer panels 26, 28 divided into two members and a door inner panel 27. Each panel 26, 27, 28 is made of light metal or light alloy, such as aluminum or aluminum alloy. A striker 29 is attached to a predetermined part of the door outer panel 28 which configures the front-end part of the rear door 3. The striker 29 corresponds to the door latch 16 of the front door 2.

Figure 4:
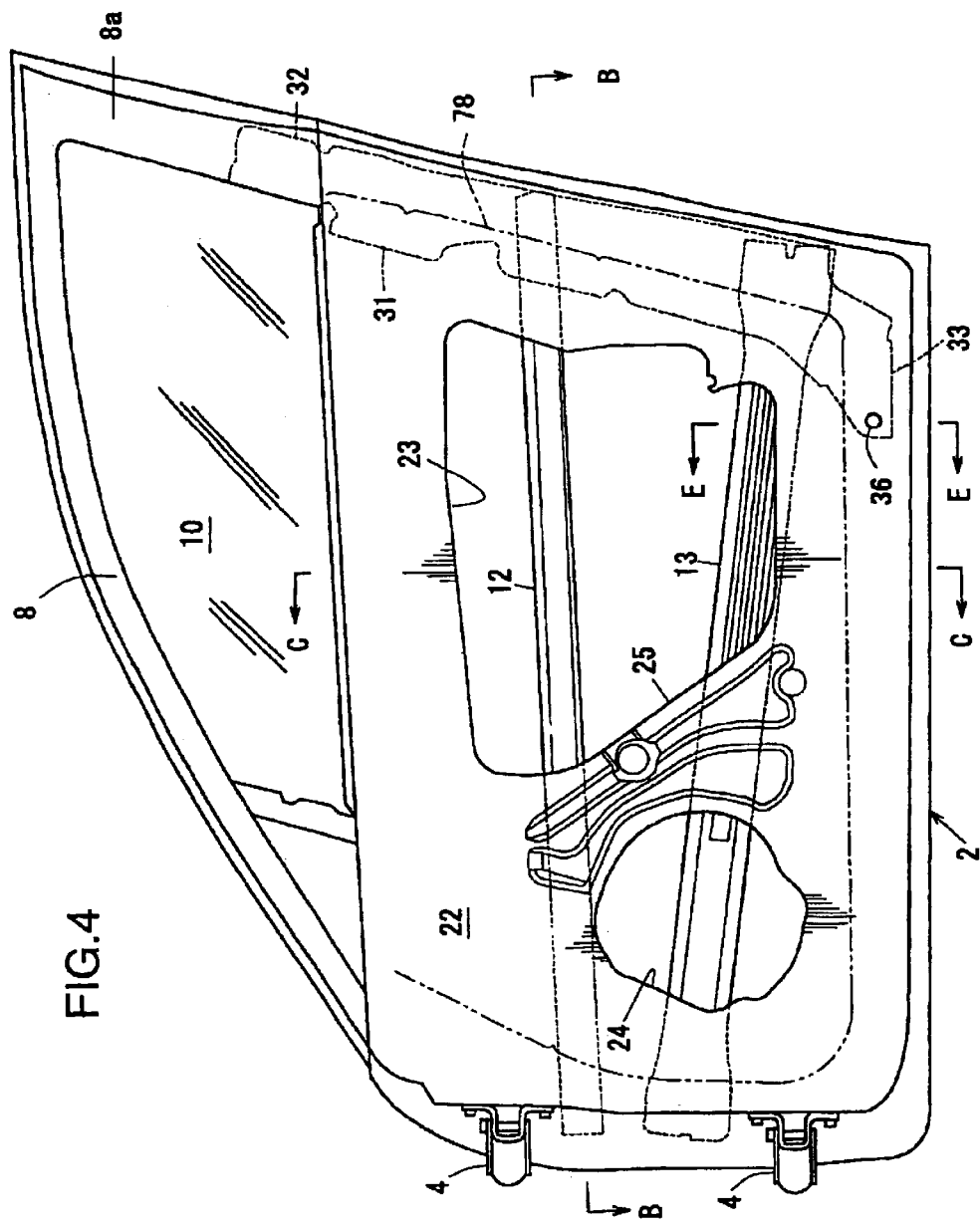
FIG. 4 is a side view showing a front door.
Figure 5:
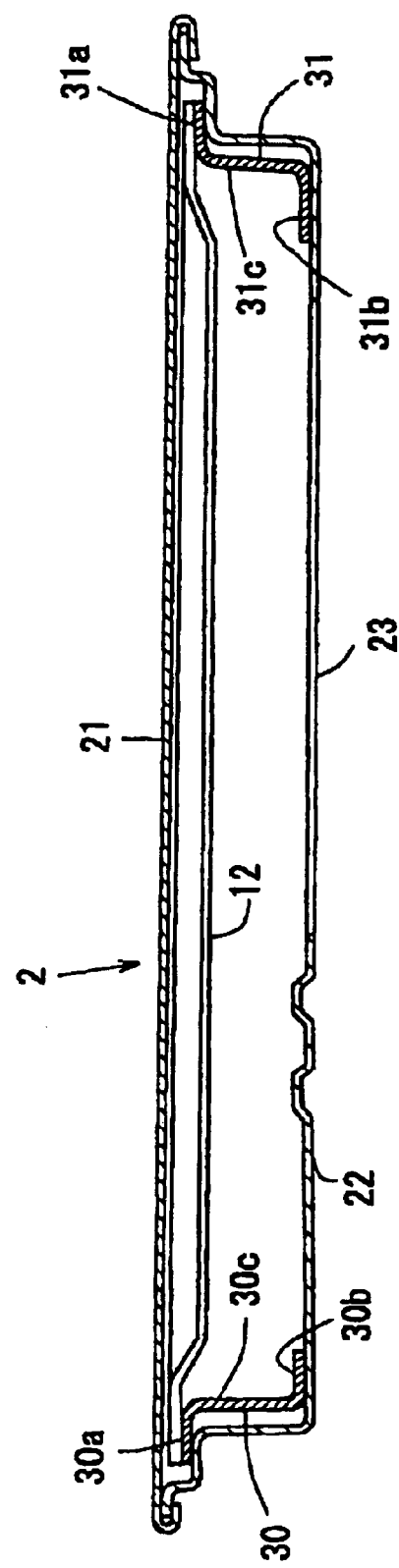
FIG. 5 is a sectional view showing the front door, seen along a B—B line in FIG. 4.

FIG. 4 is a side view showing the front door 2 on the right-hand side, seen from the inside of the vehicle cabin. FIG. 5 is a sectional view showing the front door 2, seen along a B—B line in FIG. 4. A hinge reinforcement 30 is disposed at a front longitudinal-side part of the front door 2 configured by joining the door outer panel 21 and the door inner panel 22. The hinge reinforcement 30 extends in the up-and-down directions along the front longitudinal-side part. Herein, the hinge reinforcement 30 is a rigid member which allows the door to become more rigid.

The hinge reinforcement 30 is formed by a thick-plate member and has a substantially Z-shaped cross section. Thus, the hinge reinforcement 30 includes: a front strip 30a which extends in the front-and-rear directions of the vehicle on the vehicle outside; a rear strip 30b which extends in the front-and-rear directions of the vehicle on the vehicle inside; and a connecting strip 30c connecting both strips 30a, 30b which extends in the vehicle-width directions.

A front-door rear reinforcement 31, which is a rigid member, is disposed at a rear longitudinal-side part of the front door 2. It extends in the up-and-down directions along the rear longitudinal-side part. The front-door rear reinforcement 31 makes the door more rigid. Thus, the rigidity becomes greater against a side bump, thereby reducing the depth to which the door 2 makes its way into the vehicle cabin when the vehicle is bumped at its side part.

The front-door rear reinforcement 31, as shown in FIGS. 3, 5, 6 and 7, is formed by a thick-plate member and has a substantially Z-shaped cross section. Thus, the front-door rear reinforcement 31 includes: a rear strip 31a which extends in the front-and-rear directions of the vehicle on the vehicle outside; a front strip 31b which extends in the front-and-rear directions of the vehicle on the vehicle inside; and a connecting strip 31c connecting both strips 31a, 31b which extends in the vehicle-width directions.

As shown in FIG. 4, the front-door rear reinforcement 31 includes an extending-out portion 32 at its upper-end part. The extending-out portion 32 extends continuously into a rear longitudinal-side part 8a of a door sash portion 8. It makes the sash structure more rigid and also prevents seal members from being sucked out of the vehicle by negative pressure while it is running at high speed.

As shown in FIG. 4, the front-door rear reinforcement 31 includes an extending portion 33 at its lower-end part. The extending portion 33 extends forward along the front-and-rear side at the lower part of the front door 2. It not only makes the front-door rear reinforcement 31 itself more rigid, but also makes the front-door lower part more rigid.

Figure 6:
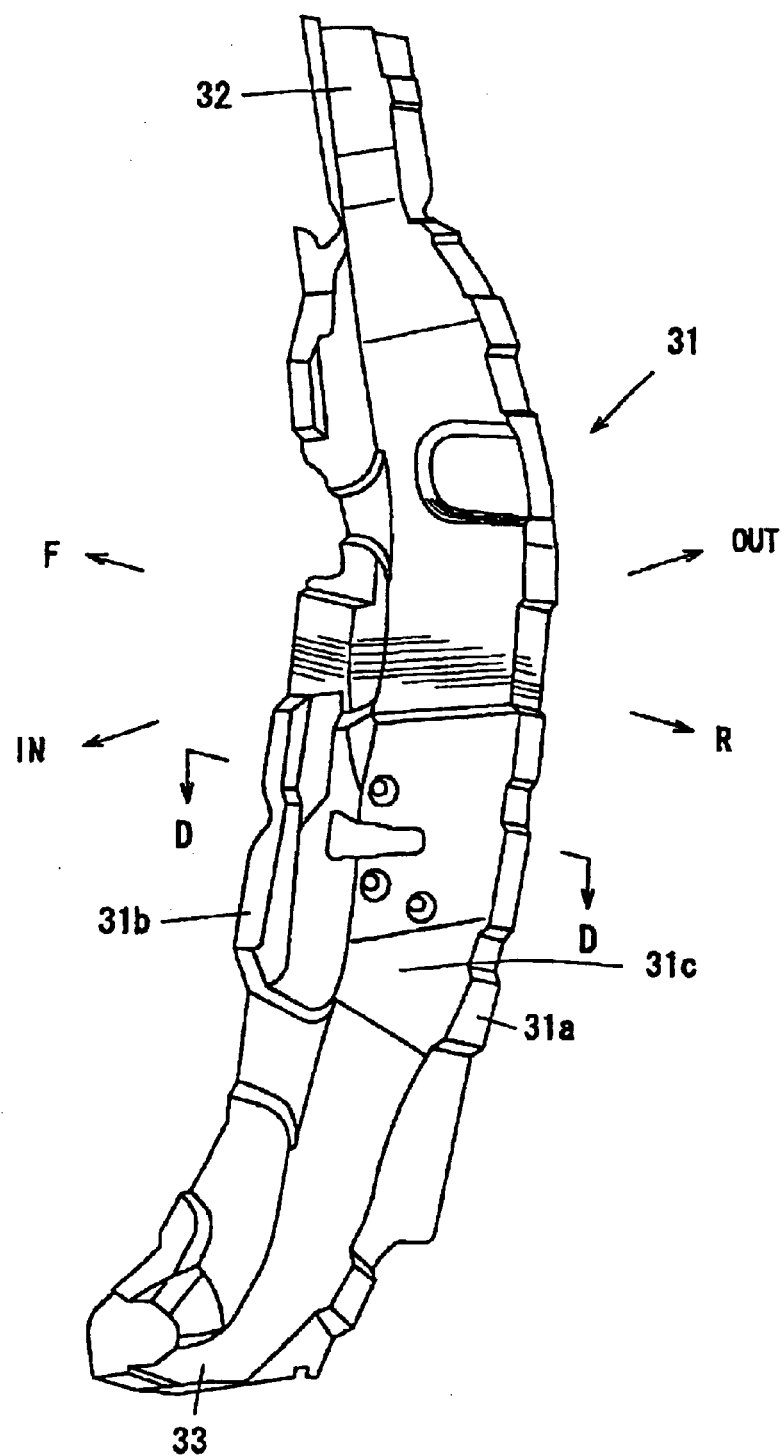
FIG. 6 is a perspective view showing a front-door rear reinforcement.
Figure 7:
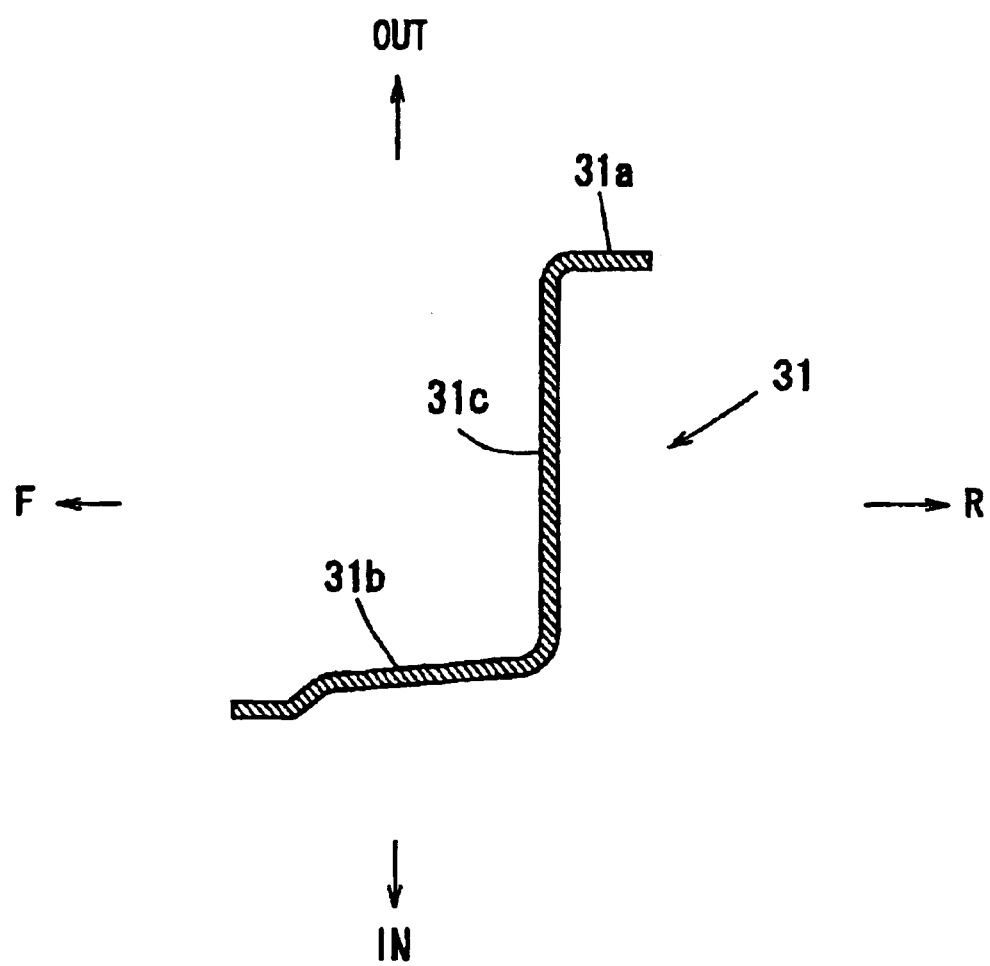
FIG. 7 is a sectional view showing the front-door rear reinforcement, seen along a D—D line in FIG. 6.

Throughout the whole front-door rear reinforcement 31 including the extending-out portion 32 and the extending portion 33, as shown in FIG. 6, a plurality of uneven portions are formed which make the front-door rear reinforcement 31 stronger.

Figure 8:
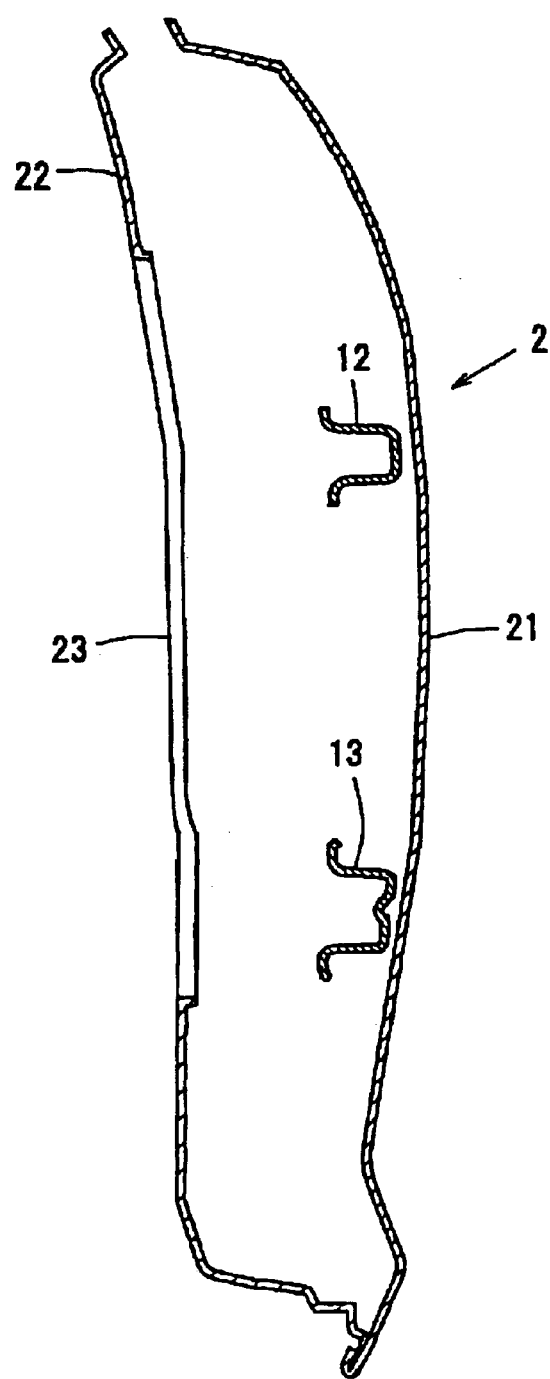
FIG. 8 is a sectional view showing the front door, seen along a C—C line in FIG. 4.

As shown in FIGS. 4, 5 and 8, the impact bar 12 mentioned above is joined and fixed to the front strip 30*a* of the hinge reinforcement 30 and the rear strip 31*a* of the front-door rear reinforcement 31, between each strip or between each rigid member, such that it extends in the front-and-rear directions of the vehicle. In other words, the front-end part and the rear-end part of the impact bar 12 overlap the hinge reinforcement 30 and the front-door rear reinforcement 31, respectively, thereby making the structure strong.

The lower impact bar 13 placed apart from the impact bar 12 in the up-and-down directions, as shown in FIG. 4, is also joined and fixed to the front strip 30*a* of the hinge reinforcement 30 and the rear strip 31*a* of the front-door rear reinforcement 31, between each strip or between each rigid member, such that it extends in the front-and-rear directions of the vehicle. In other words, the front-end part and the rear-end part of the impact bar 13 overlap the hinge reinforcement 30 and the front-door rear reinforcement 31, respectively, thereby making the structure strong.

As shown in FIG. 8, the plurality of impact bars 12, 13 placed apart in the front-and-rear directions have a sideways convex-shaped cross section with protruding on the vehicle outside. This cross-sectional structure makes the impact bars 12, 13 themselves more rigid. In addition, the plurality of impact bars 12, 13 are placed apart up and down from each other. Thereby, these impact bars 12, 13 can bear a load given at the time of a side bump, over a wider range in the up-and-down directions.

Figure 9:
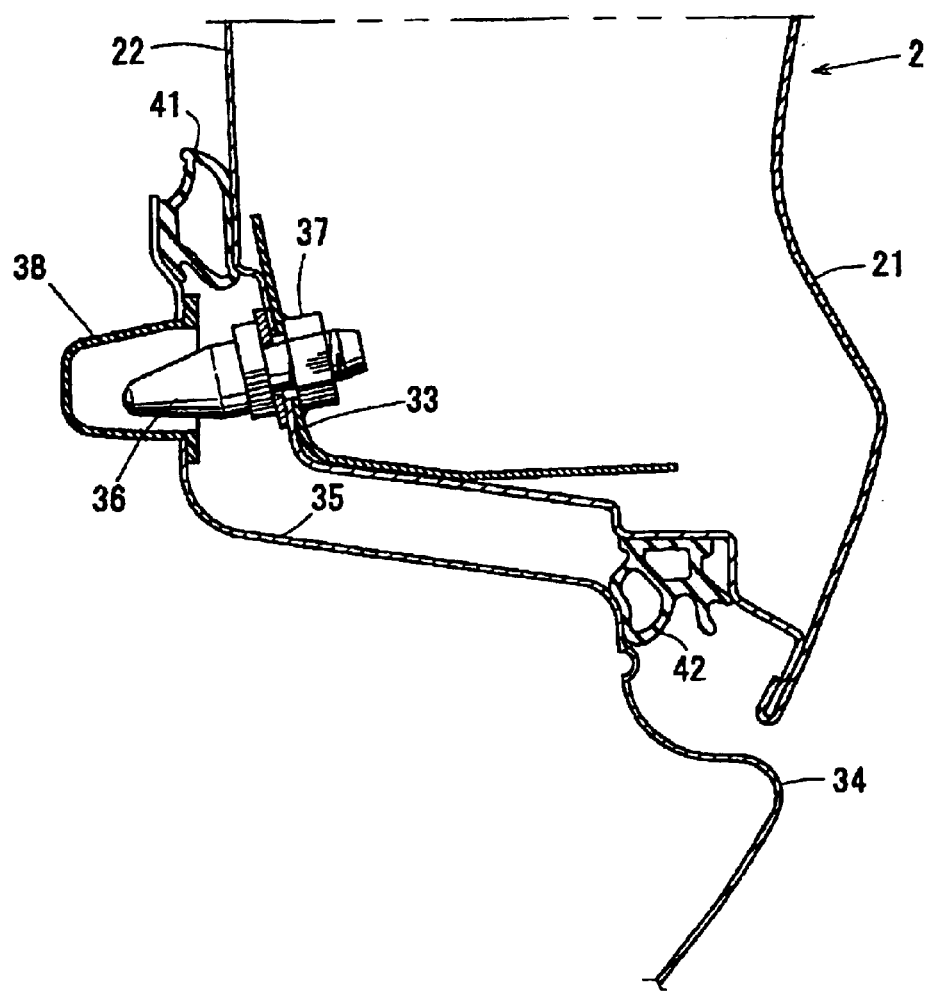
FIG. 9 is an enlarged sectional view showing a main part of the front door, seen along an E—E line in FIG. 4.

FIG. 9 is an enlarged sectional view showing a main part of the front door, seen along an E—E line in FIG. 4. A catcher pin 36 is provided at a rear lower-end part of the front door 2. The catcher pin 36 protrudes convexly from the front door 2 toward a side-shell outer 35 of a side shell 34 on the vehicle-body side.

A nut 37 is welded and fixed beforehand to the extending portion 33 of the lower end part of the aforementioned front-door rear reinforcement 31. In the extending portion 33 and the door inner panel 22 which face the nut 37, a hole portion is formed which a screw portion of the catcher pin 36 is inserted through. Thus, the catcher pin 36 is tightened and fixed to the nut 37 from the vehicle-cabin inside of the door inner panel 22.

The catcher pin 36 controls inroads of the door 2 at the time of a vehicle-side bump. In a position corresponding to the catcher pin 36, a catcher-pin receiving portion 38 is provided in the side-shell outer 35. The catcher-pin receiving portion 38 is made of synthetic resin and has a concave shape. The catcher pin 36 is inserted into the catcher-pin receiving portion 38 when the front door 2 is closed.

FIG. 9 is the sectional view when the front door 2 is fully closed. The internal diameter of the catcher-pin receiving portion 38 is set to be relatively long compared with the external diameter of the catcher pin 36. Herein, the catcher pin 36 is a door-inroads controlling member for controlling inroads of the front door 2 when the vehicle is bumped at its side part.

In addition, the catcher pin is provided not only in the front door 2, but also in the lower part of the rear door 3, as shown in FIG. 1 and FIG. 2. Catcher pins 36, 39, 40 are each located at substantially equal intervals in the front-and-rear directions.

In FIG. 9, a seal member 41 which seals a gap between the vehicle body and the front door 2 is disposed on the upper-end exterior surface of the side-shell outer 35. On the other hand, a seal member 42 which seals a gap between the front door 2 and the side shell 34 as the vehicle body is provided in the lower part of the door inner panel 22 of the front door 2.

Figure 10:
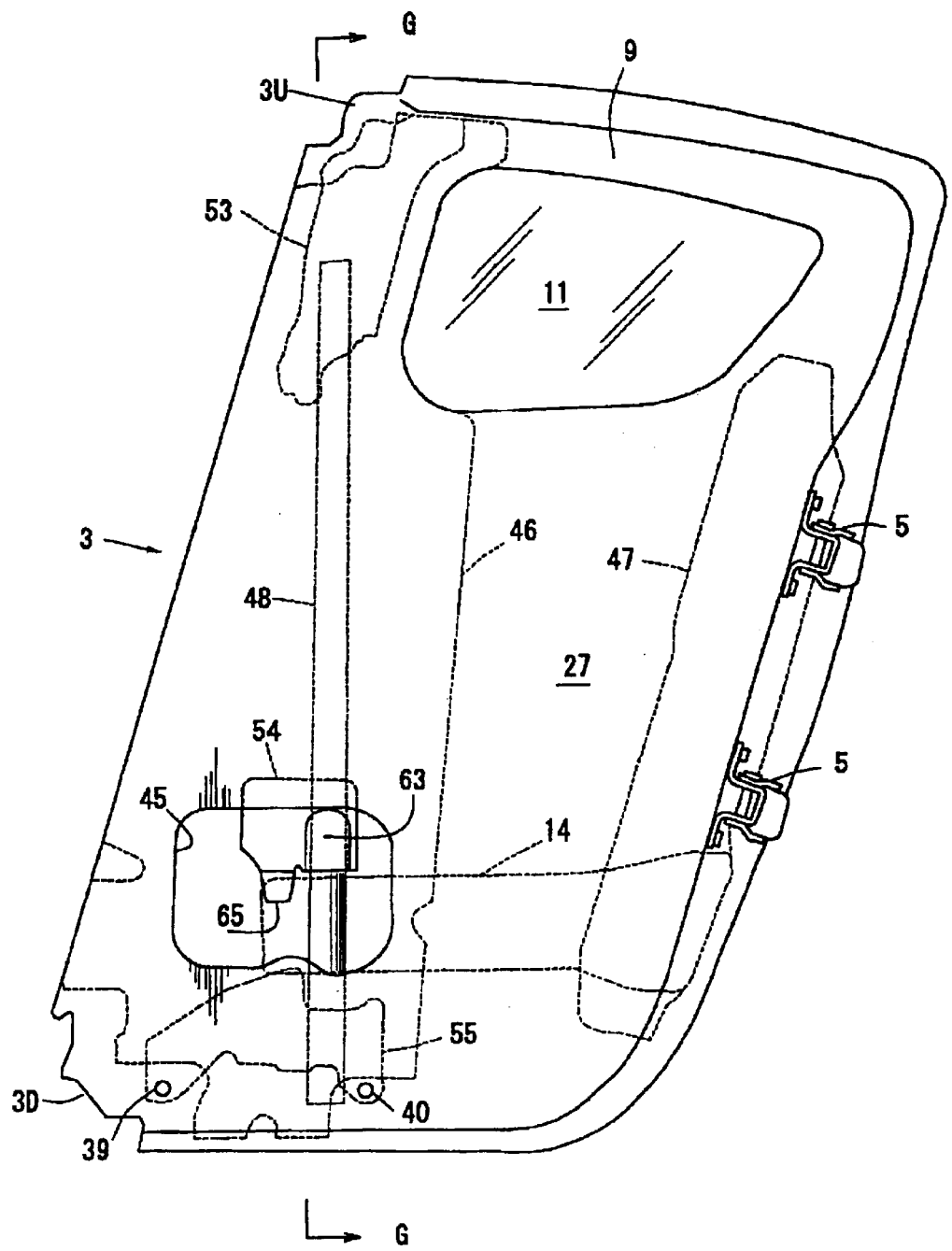
FIG. 10 is a side view showing a rear door.

FIG. 10 is a side view showing the right-hand rear door 3, seen from the inside of the vehicle cabin. FIG. 11 is a sectional view showing the rear door 3, seen along a G—G line in FIG. 10. As shown in FIG. 10 and FIG. 11, in the lower part of the rear door 3, an opening portion 45 is formed at a predetermined part of the door inner panel 27. A bracket 44 of a seatbelt retractor 43 is attached to the opening portion 45.

As shown in FIGS. 3, 10 and 11, a vertical reinforcement 46 is provided in the front longitudinal-side part of the rear door 3. The vertical reinforcement 46 extends along the up-and-down directions over a substantially entire height of the front longitudinal-side part including the door sash portion 9 of the rear door 3.

The vertical reinforcement 46 is formed by a thick-plate member of light metal or light alloy such as aluminum or aluminum alloy. As shown in FIG. 3, it has a substantially hat-shaped cross section. Thus, the vertical reinforcement 46 includes: a front strip 46*a* which extends in the front-and-rear directions of the vehicle in the vehicle-inside front part; a front-plane strip 46*b* which extends in a vehicle-width direction from the rear end of the front strip 46*a*; a side-plane strip 46*c* which extends rearward in the front-and-rear directions of the vehicle from the outer end of the front-plane strip 46*b*; a rear-plane strip 46*d* which extends rearward in the front-and-rear directions of the vehicle and inward in the vehicle-width directions from the rear end of the side-plane strip 46*c*; and a rear strip 46*e* which extends rearward in the front-and-rear directions of the vehicle from the inner end of the rear-plane strip 46*d*.

The front strip 46*a* is sandwiched and fixed between the door inner panel 27 and the door outer panel 28. The striker 29 is attached to the part in which the front-plane strip 46*b* overlaps with the door outer panel 28. The rear strip 46*e* is joined to the middle inner-surface of the door inner panel 27 in the front-and-rear directions.

Furthermore, as shown in FIG. 3, a hinge reinforcement 47 is provided in the rear longitudinal-side part of the rear door 3. The hinge reinforcement 47 is a rigid member and extends along the up-and-down directions of the rear door 3.

The hinge reinforcement 47 is formed by a thick-plate member of light metal or light alloy such as aluminum or aluminum alloy and has a substantially Z-shaped cross section. Thus, the hinge reinforcement 47 includes: a front strip 47*a* which extends in the front-and-rear directions of the vehicle on the vehicle inside; a rear strip 47*b* which extends in the front-and-rear directions of the vehicle on the vehicle outside; and a connecting strip 47*c* connecting both strips 47*a*, 47*b* which extends in the vehicle-width directions.

As shown in FIGS. 3, 10 and 11, the lateral impact bar 14 mentioned previously is joined and fixed to the side-plane strip 46*c* of the vertical reinforcement 46 and the rear strip 47*b* of the hinge reinforcement 47, between each strip or between each rigid member, such that it extends in the front-and-rear directions of the vehicle. In other words, the front-end part and the rear-end part of the lateral impact bar 14 overlap the vertical reinforcement 46 and the hinge reinforcement 47, respectively. This overlap structure allows the rear door 3 to become more rigid against a side bump.

As its cross sectional shape is shown in FIG. 11, the lateral impact bar 14 has an uneven shape which makes the lateral impact bar 14 itself more rigid.

In the rear door 3, as shown in FIG. 10, its front longitudinal-side part leans to the back. Between a front-upper edge part 3U (or a front-upper corner part) of the front longitudinal-side part and a part which is away from a front-lower edge part 3D (or a front-lower corner part) thereof, a longitudinal impact bar 48 is provided which extends substantially perpendicularly in the up-and-down directions.

This longitudinal impact bar 48 is formed by a pipe member made of high-strength steel (or a rigid pipe member).

This longitudinal impact bar 48 is formed by a pipe member made of high-strength steel. As can be seen from the side in FIG. 10, the vertical reinforcement 46 is placed to overlap with the longitudinal impact bar 48 in the front-and-rear directions of the vehicle. More specifically, as shown in FIG. 3, a closed cross section 49 is formed between the vertical reinforcement 46 and the door inner panel 27 of the rear door main body 7. The longitudinal impact bar 48 is placed inside this closed cross section 49.

Furthermore, the lateral impact bar 14, as shown in FIG. 3 and FIG. 10, is placed to overlap at its front part with the longitudinal impact bar 48 in the front-and-rear directions of the vehicle.

Besides, as the state in which the front door 2 and the rear door 3 are closed is shown in FIG. 3, when both doors 2, 3 are closed, the front-door rear reinforcement 31 is placed to overlap with the vertical reinforcement 46 disposed in the front longitudinal-side part of the rear door 3. This overlap structure allows the overlapping part to become more rigid, reducing the depth to which the side door makes its way into the vehicle cabin at the time of a vehicle-side bump.

As shown in FIG. 11, a door latch reinforcement 50 is provided inside the lower part of the rear door 3. Herein, the door latch reinforcement 50 has a concave longitudinal section.

The door latch reinforcement 50 includes a vehicle-outside stand-up strip and a vehicle-inside stand-up strip. The vehicle-outside stand-up strip is fixed, using a rivet 51 (or an attachment member), to the lower part of the vertical reinforcement 46. On the other hand, the vehicle-inside stand-up strip is fixed, using attachment members 52 such as a bolt, a nut and a rivet, to the door inner panel 27, together with a bracket 44 and a lower-end bracket 55 (mentioned below) of the longitudinal impact bar 48.

Figure 12:
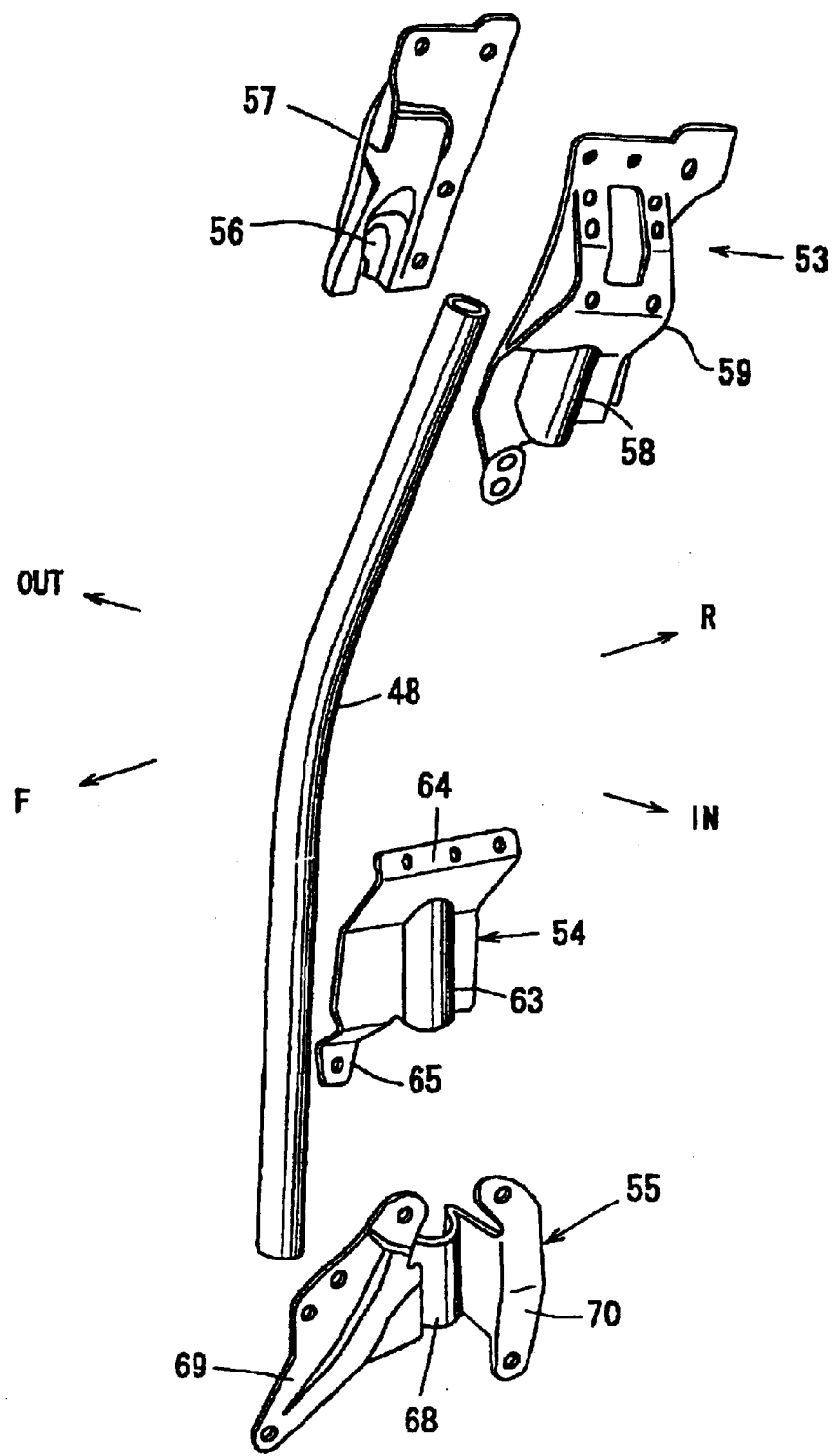
FIG. 12 is a perspective exploded view showing a longitudinal impact bar and attachment brackets for the impact bar.

The longitudinal impact bar 48 is fixed, as shown in FIG. 11 and FIG. 12, using an upper-end bracket 53, a middle bracket 54 and the lower-end bracket 55, to the vertical reinforcement 46 and the door inner panel 27.

Herein, the upper-end bracket 53 is configured by two members of an outer bracket 57 and an inner bracket 59. The outer bracket 57 includes a holding portion 56 which has a substantially semicircular section. The inner bracket 59 includes a holding portion 58 which has a substantially semicircular section. Both brackets 57, 59 are joined to hold the upper-end part of the longitudinal impact bar 48. The outer bracket 57 is fixed, using a rivet 60 (or an attachment member), to the upper part of the vertical reinforcement 46. On the other hand, the inner bracket 59 is fixed, using attachment members 61 . . . such as a bolt and a nut, to the door inner panel 27, together with the door latch 17 and an anchor bracket 62 used for a shoulder-belt anchor.

The middle bracket 54 includes: a holding portion 63 which has a substantially semicircular section; an upper-part attachment strip 64; and a lower-part attachment strip 65. As also shown in FIG. 3, the holding portion 63 holds a middle part of the longitudinal impact bar 48. The upper-part attachment strip 64 is fixed, using attachment members 66 such as a bolt and a nut, to the door inner panel 27, together with the bracket 44. The lower-part attachment strip 65 is fixed, using a rivet 67 (or an attachment member), to the vertical reinforcement 46 together with the lateral impact bar 14.

In other words, the middle part of the longitudinal impact bar 48 in the up-and-down directions is supported with the middle bracket 54 connected to both the vertical reinforcement 46 and the door inner panel 27. The lateral impact bar 14, the vertical reinforcement 46 and the middle bracket 54 are fixed all together, using the rivet 67.

The lower-end bracket 55 includes: a holding portion 68 which has a substantially semicircular section; and front and rear attachment strips 69, 70. The holding portion 68 holds a lower-end part of the longitudinal impact bar 48, the front and rear attachment strips 69, 70 is fixed, using attachment members 52 such as a bolt, a nut and a rivet, to the door inner panel 27, together with the door latch reinforcement 50 and the bracket 44.

Herein, the upper-end bracket 53, the middle bracket 54 and the lower-end bracket 55 are welded and fixed at their predetermined part to a circumferential part of the longitudinal impact bar 48.

As shown in FIG. 11, as a locking mechanism of the rear door 3, the door latch 17 at its upper part and the door latch 18 at its lower part are attached to the upper-end and lower-end parts of the longitudinal impact bar 48, respectively. More specifically, the door latch 17 at its upper part is attached to the upper-end part of the longitudinal impact bar 48 via the inner bracket 59, and the door latch 18 at its lower part is attached to the lower-end part of the longitudinal impact bar 48 via the lower-end bracket 55 and the door latch reinforcement 50.

In FIG. 11, a roof rail outer 72 and a roof rail inner 73 are joined to a side part of a roof panel 71 at an upper part of the vehicle-body side. The striker 19 mentioned previously is attached to the roof rail inner 73.

The side shell 34 is joined to a side part of a floor panel 74 at a lower part of the vehicle-body side. Herein, the side shell 34 is configured by a side-shell inner 75 and the side-shell outer 35. The striker 20 mentioned above is attached to a predetermined part of the side-shell outer 35. The door latches 17, 18 are engaged with these strikers 19, 20 on the vehicle-body side, respectively. Herein, the door latches 17, 18 are attached to the upper-end and lower-end parts of the longitudinal impact bar 48 of the rear door 3, respectively.

Figure 13:
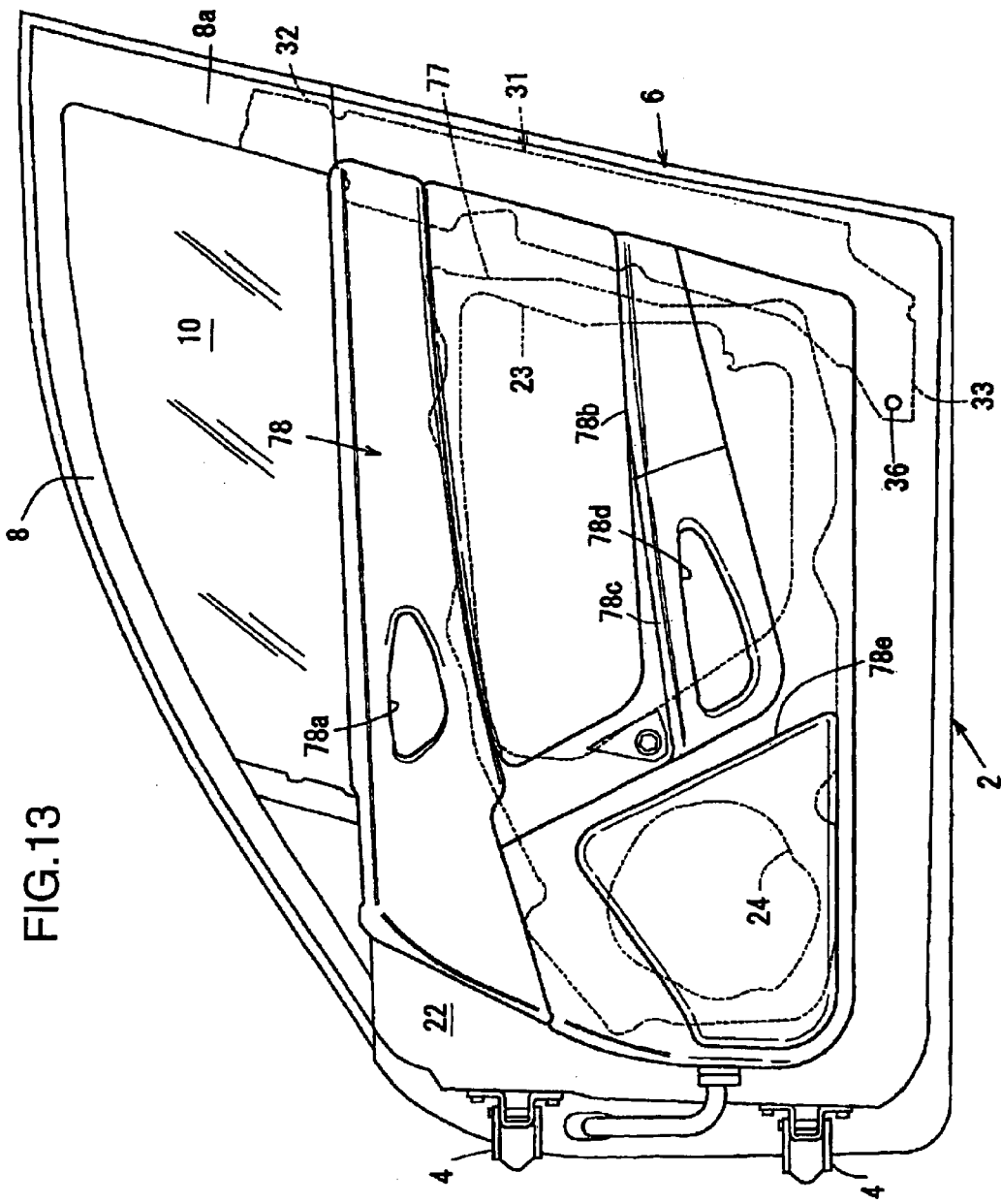
FIG. 13 is a side view showing the front door which is provided with a door trim.
Figure 14:
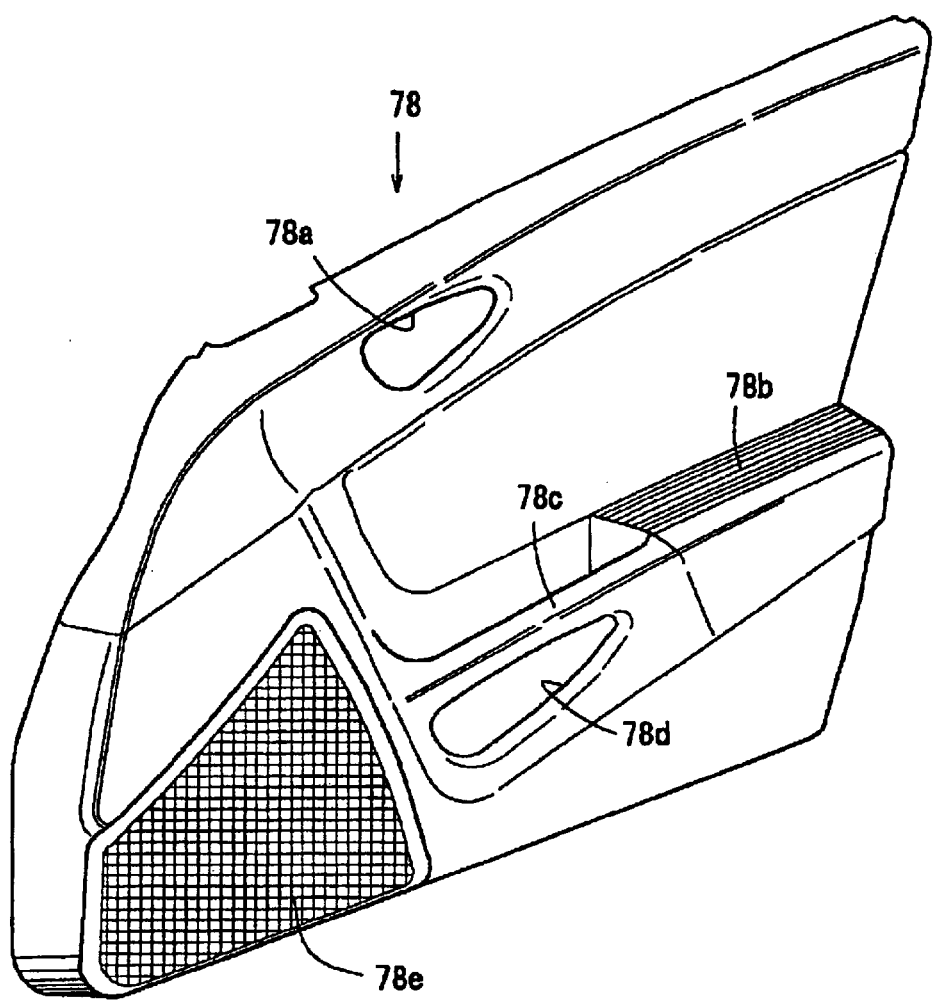
FIG. 14 is a perspective view showing a front-door trim.

FIG. 13 is a side view showing the front door 2, seen from the inside of the vehicle cabin, in which a door trim 78 is attached via a door module 77 to the front door 2 on the inside of the vehicle cabin. FIG. 14 is a perspective view showing only the door trim 78. The door trim 78 is formed by uniting a plurality of members: a door inner-handle attachment hole 78a at its upper part; an arm rest 78b on the rear side at the middle part in the up-and-down directions; a pull handle 78c and an opening portion 78d in front of the arm rest 78b; and a pocket portion 78e on the lower-front side. As shown in FIG. 13, the door trim 78 is attached to the door main body 6 on the inside of the vehicle cabin.

Figure 15:
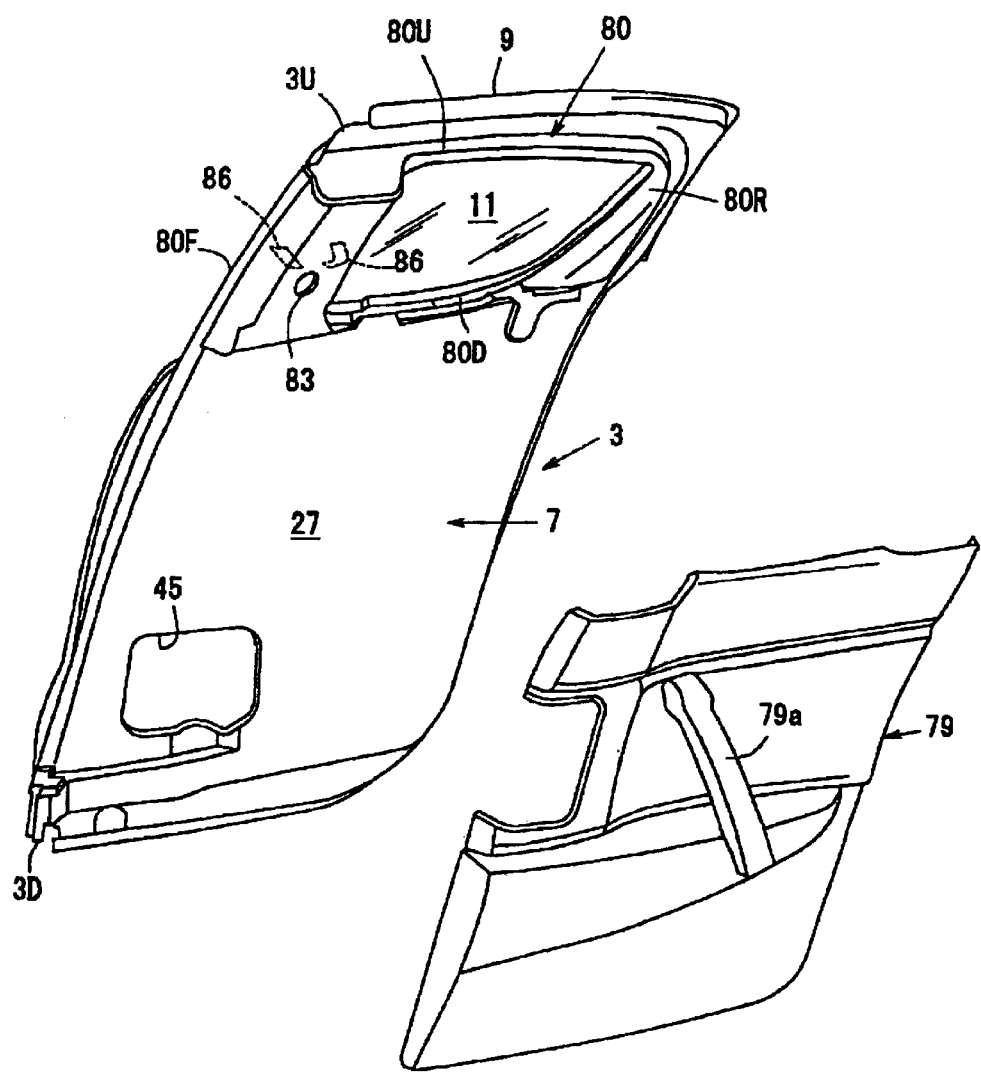
FIG. 15 is a perspective partially-exploded view showing the rear door.

FIG. 15 is a perspective exploded view showing the rear door 3 and door trims 79, 80 provided in the rear door 3 on the inside of the vehicle cabin. Herein, the rear door 3 is configured by the door main body 7 and the door sash portion 9 which extends upward from the door main body 7 and supports the flip window member 11 used as a door window member. In the rear door 3, an upper door trim 80 used as a sash-side door trim which covers the door sash portion 9 is provided in the door sash portion 9 on the inside of the vehicle cabin. (Hereinafter, the upper door trim is referred to as "upper trim" for short). Below the upper door trim 80, a lower door trim 79 (Hereinafter, the lower door trim is referred to as "lower trim" for short) is provided which is used as a door main body-side door trim that covers the door main body 7 on the inside of the vehicle cabin.

The lower trim 79 is made of a soft material so that the feel of a material can be secured and has a substantially square shape. In its middle part, a pull handle 79a is united therewith, which inclines from the upper front to the lower rear.

On the other hand, the upper trim 80 is made of a hard material and has a substantially square frame-shape so that it corresponds to the door sash portion 9.

Figure 16:
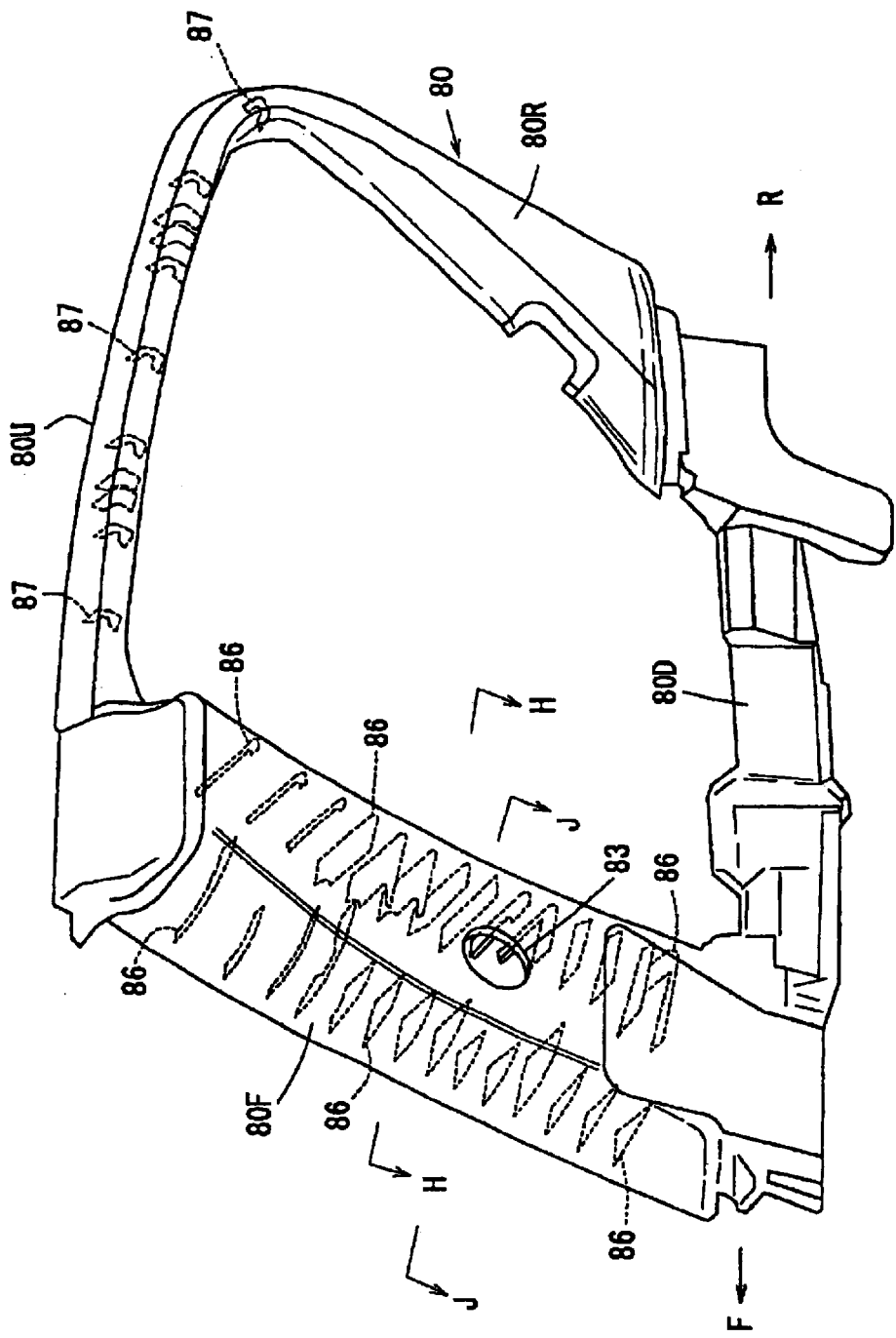
FIG. 16 is a perspective view showing an upper trim.
Figure 17:
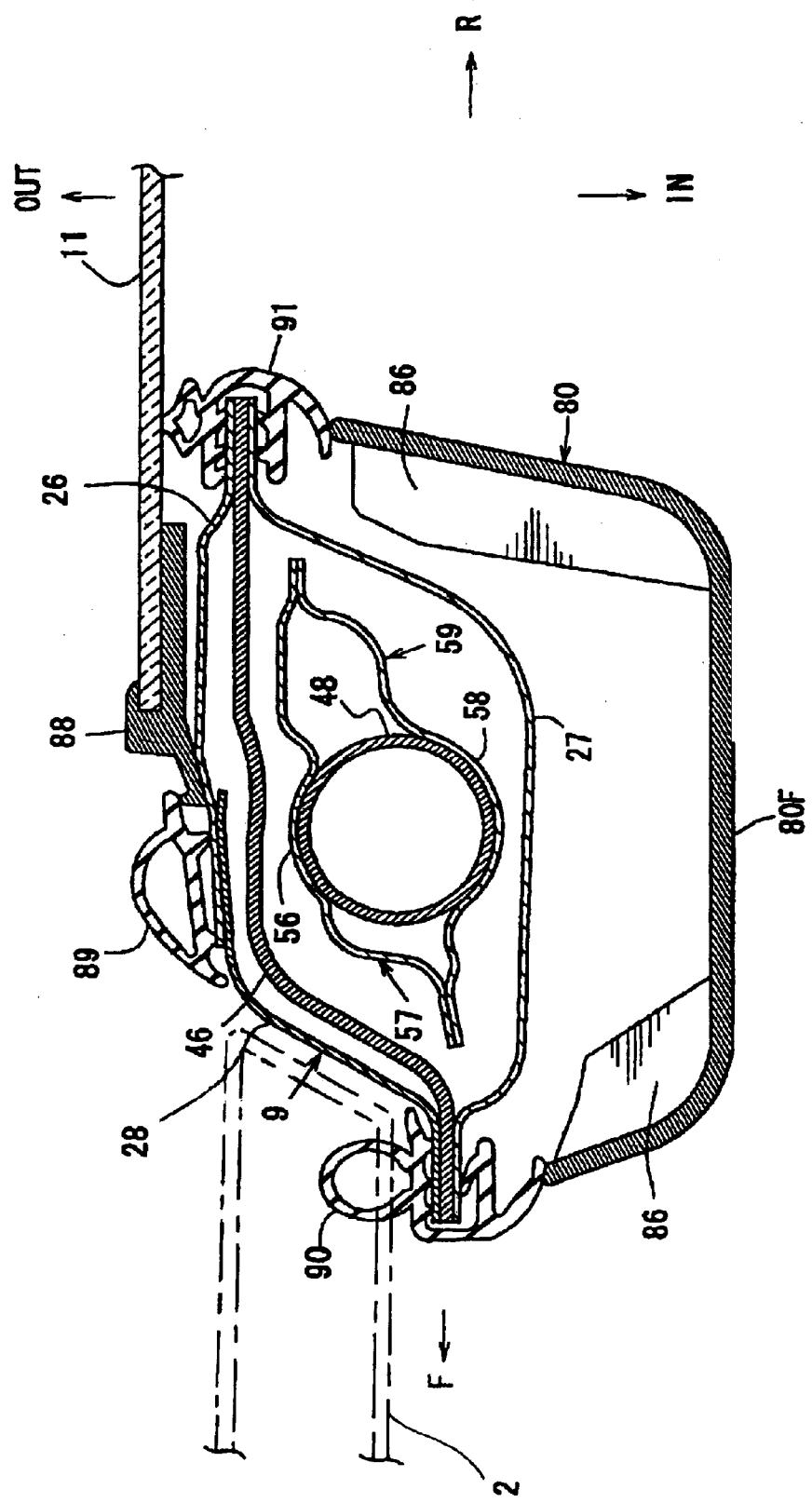
FIG. 17 is a sectional view showing the rear door, seen along an H—H line in FIG. 16.
Figure 18:
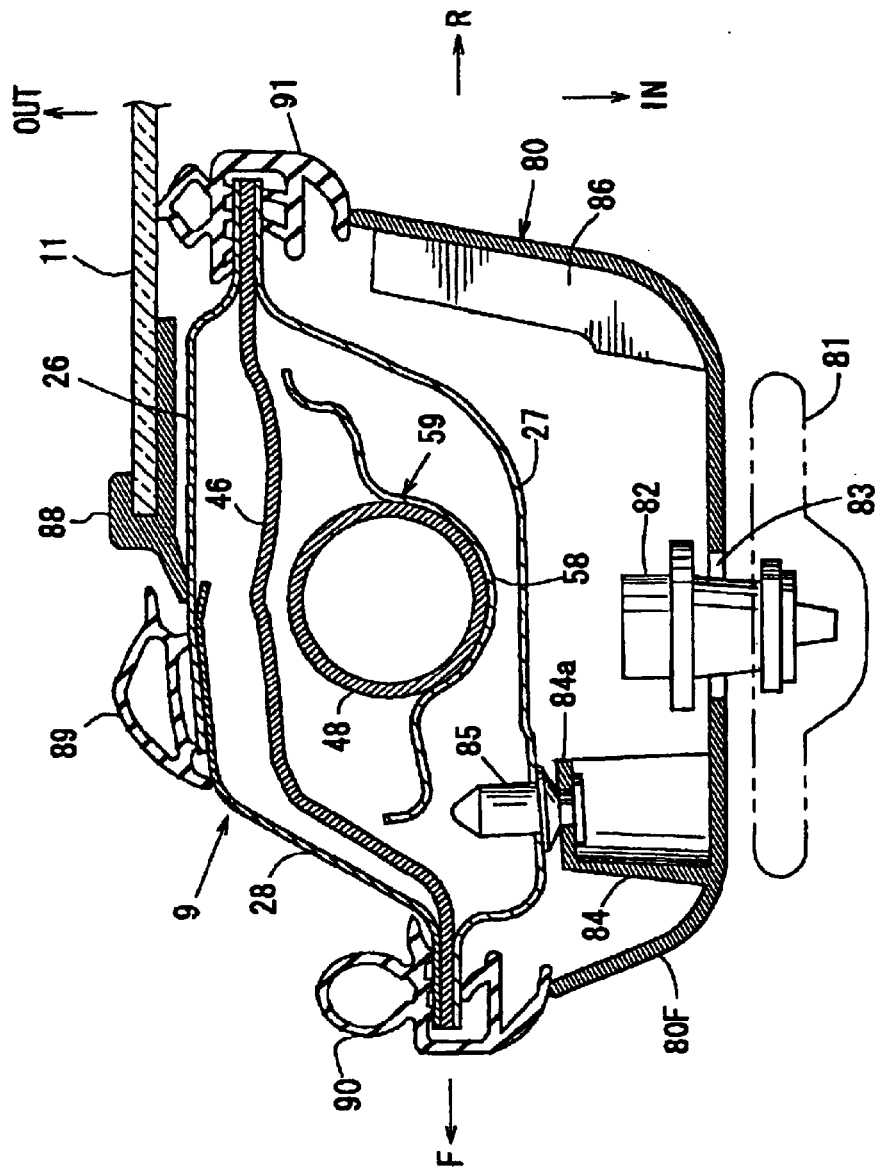
FIG. 18 is a sectional view showing the rear door, seen along a J—J line in FIG. 16.

FIG. 16 is a perspective view showing the upper trim 80. FIG. 17 is a sectional view showing the rear door 3, seen along an H—H line in FIG. 16. FIG. 18 is a sectional view showing the rear door 3, seen along a J—J line in FIG. 16. As shown in FIG. 16, the upper trim 80 includes a front longitudinal-side part 80F, a rear longitudinal-side part 80R, an upper-side part 80U, and a lower-side part 80D. The upper trim 80 has a substantially square frame-shape which is formed by uniting those parts.

In a substantially middle position in the up-and-down directions of the front longitudinal-side part 80F of the upper trim 80, as shown in FIG. 16 and FIG. 18, a hole portion 83 is formed which an attachment member 82 used for attaching a shoulder anchor 81 is placed in.

As shown in FIG. 18, at each of a plurality of parts (but, only one part is shown in the figure) of the upper trim 80, a semi-cylindrical attachment leg portion 84 is united therewith. The leg portion 84 includes an attachment stand 84a at its end so that the upper trim 80 can be attached to the door sash portion 9 and the upper-end part of the door main body 7. The upper trim 80 is attached, using a clip 85 provided in the attachment stand 84a, to the door sash portion 9 of the rear door 3 on the inside of the vehicle cabin, specifically to the surface of the door inner panel 27 on the inside of the vehicle cabin.

In the front longitudinal-side part 80F of the upper trim 80, a plurality of ribs 86 are united therewith on the front and rear inner surfaces of the front longitudinal-side part 80F which has a concave cross-sectional shape.

Each of those plurality of ribs 86 is placed substantially horizontally and is apart from each other in the front-and-rear and up-and-down directions. These ribs 86 are an impact absorbing portion which absorbs an impact load when an occupant (particularly, the head of a front-seat occupant) comes into contact therewith from the inside of the vehicle cabin when the vehicle is bumped at its side part.

As shown in FIG. 17 and FIG. 18, the plurality of ribs 86 . . . used as an impact absorbing portion are put in a position on the inside of the vehicle cabin which corresponds to the vertical reinforcement 46 and the longitudinal impact bar 48. In addition, the part where the ribs 86 are placed in the upper trim 80 of the rear door 3, or the front longitudinal-side part 80F, juts out from the inner surface of the front door 2 on the inside of the vehicle cabin toward the inside of the vehicle cabin. In other words, no trim member is provided in the door sash portion 8 of the front door 2, and thereby, the front longitudinal-side part 80F of the upper trim 80 on the side of the rear door 3 juts out most toward the inside of the vehicle cabin.

As shown in FIG. 16, in the upper-side part 80U of the upper trim 80, a plurality of reinforcement ribs 87 are placed apart and are united therewith.

In FIG. 17 and FIG. 18, reference numeral 88 denotes a mold member provided in a peripheral part of the flip window member 11: 89; a weather strip which covers the divided part of the door outer panels 26, 28 on the outside of the vehicle: 90; a weather strip which is attached to the part where each component 28, 46, 27 is joined together to seal a gap between the rear door 3 and the front door 2: 91; a weather strip which is attached to the part where each component 28, 46, 27 is joined together to seal a gap between the door sash portion 9 and the flip window member 11.

The aforementioned description has been provided of the structure mainly of the side door and the door trim on the right-hand side. However, the side door and the door trim on the left-hand side are configured such that they are substantially symmetrical with those of on the right-hand side. In the drawings, reference character F designates the front of the vehicle; R, the rear of the vehicle; IN, the inside of the vehicle; OUT, the outside of the vehicle.

The impact absorbing structure for a vehicle side door according to the aforementioned embodiment, the side door (refer to the rear door 3) opens and closes a door opening portion 15 formed in a side part of a vehicle and includes: a door main body 7 which has a door inner panel 27 and door outer panels 26, 28 joined to the door inner panel 27; and a door sash portion 9 which extends upward from the door main body 7 and supports a door window member (refer to the flip window member 11), and a sash-side door trim (refer to the upper trim 80) which covers the door sash portion 9 is provided in the door sash portion 9 on the inside of a vehicle cabin; and an impact absorbing portion (refer to the ribs 86) which absorbs an impact load when an occupant comes into contact with the sash-side door trim (refer to the upper trim 80) from the inside of the vehicle cabin is provided in a front longitudinal-side part 80F of the sash-side door trim (refer to the upper trim 80).

According to this configuration, the impact absorbing portion (refer to the ribs 86) is provided in the front longitudinal-side part 80F of the sash-side door trim (refer to the upper trim 80). Thereby, if an occupant comes into contact with the sash-side door trim (refer to the upper trim 80) from the inside of the vehicle cabin when the vehicle is bumped at its side part, the absorption of an impact on the occupant can be secured, keeping the occupant safer. In addition, the impact absorbing portion (refer to the ribs 86) which absorbs an impact load is united to the sash-side door trim (refer to the upper trim 80), allowing the structure to become simpler.

Furthermore, a door main body-side door trim (refer to the lower trim 79) is provided below the sash-side door trim (refer to the upper trim 80), and the door main body-side door trim (refer to the lower trim 79) covers the door main body 7 on the inside of the vehicle cabin.

According to this configuration, the door sash side and the door main-body side can each be upholstered with the trims 80, 79. In addition, each of the sash-side door trim (refer to the upper trim 80) and the door main body-side door trim (refer to the lower trim 79) can be configured separately. In this case, those trims 80, 79 can be made of respective materials.

Furthermore, the sash-side door trim (refer to the upper trim 80) is made of an impact-absorbable hard material, and the door main body-side door trim (refer to the lower trim 79) is made of a soft material.

According to this configuration, the sash-side door trim (refer to the upper trim 80) made of a hard material can be aimed at absorbing an impact; the door main body-side door trim (refer to the lower trim 79) made of a soft material, improving the feel of a material.

Furthermore, a vertical reinforcement 46 is provided between the door inner panel 27 and the door outer panels 26, 28 of the side door (refer to the rear door 3), and the vertical reinforcement 46 extends in the up-and-down directions along a front longitudinal-side part of the side door (refer to the rear door 3); and the impact absorbing portion (refer to the ribs 86) in the sash-side door trim (refer to the upper trim 80) is disposed in a position on the inside of the vehicle cabin which corresponds to the vertical reinforcement 46.

According to this configuration, the impact absorbing portion (refer to the ribs 86) is provided correspondingly to the vertical reinforcement 46 having a great rigidity, enhancing the absorption of an impact on the occupant. In other words, an impact can be absorbed with making the door and the vehicle body more rigid.

Furthermore, the side door (refer to the rear door 3) is supported on a hinge 5 at a rear part thereof. According to this configuration, the side door (refer to the rear door 3) can be opened and closed on a fulcrum at its rear part.

Furthermore, the side door is a rear door 3 of the door which has a double-leafed hinged structure, and the rear door 3, together with a front door 2 supported on a hinge 4 at a front part thereof, opens and closes the continuous door opening portion 15 formed in the side part of the vehicle.

According to this configuration, in a double-leafed hinged door with no center pillar, there is the sash-side door trim (refer to the upper trim 80) including the impact absorbing portion (refer to the ribs 86) at the door sash portion 9 on the inside of the vehicle cabin of the rear door 3. Thereby, the absorption of an impact on an occupant can be secured.

Furthermore, a part at which the impact absorbing portion (refer to the ribs 86) is disposed in the sash-side door trim (refer to the upper trim 80) of the rear door 3, juts out from an inner surface of the front door 2 (shown in phantom lines in FIG. 17) on the inside of the vehicle cabin toward the inside of the vehicle cabin.

According to this configuration, the part (or the front longitudinal-side part 80F) at which the impact absorbing portion (refer to the ribs 86) is disposed in the sash-side door trim (refer to the upper trim 80), juts out toward the inside of the vehicle cabin. Thereby, when the vehicle is bumped at its side part, an occupant, or particularly, the head of a front-seat occupant, comes into contact, first of all, with the front longitudinal-side part 80F of the upper trim 80. This allows the absorption of an impact to be made sufficient.

Herein, the above described plurality of ribs 86 have the property of absorbing an impact load, and this property can be varied appropriately by changing the thickness of the ribs 86, the distance between the upper and lower ribs 86, 86, or rib density.

Figure 19:
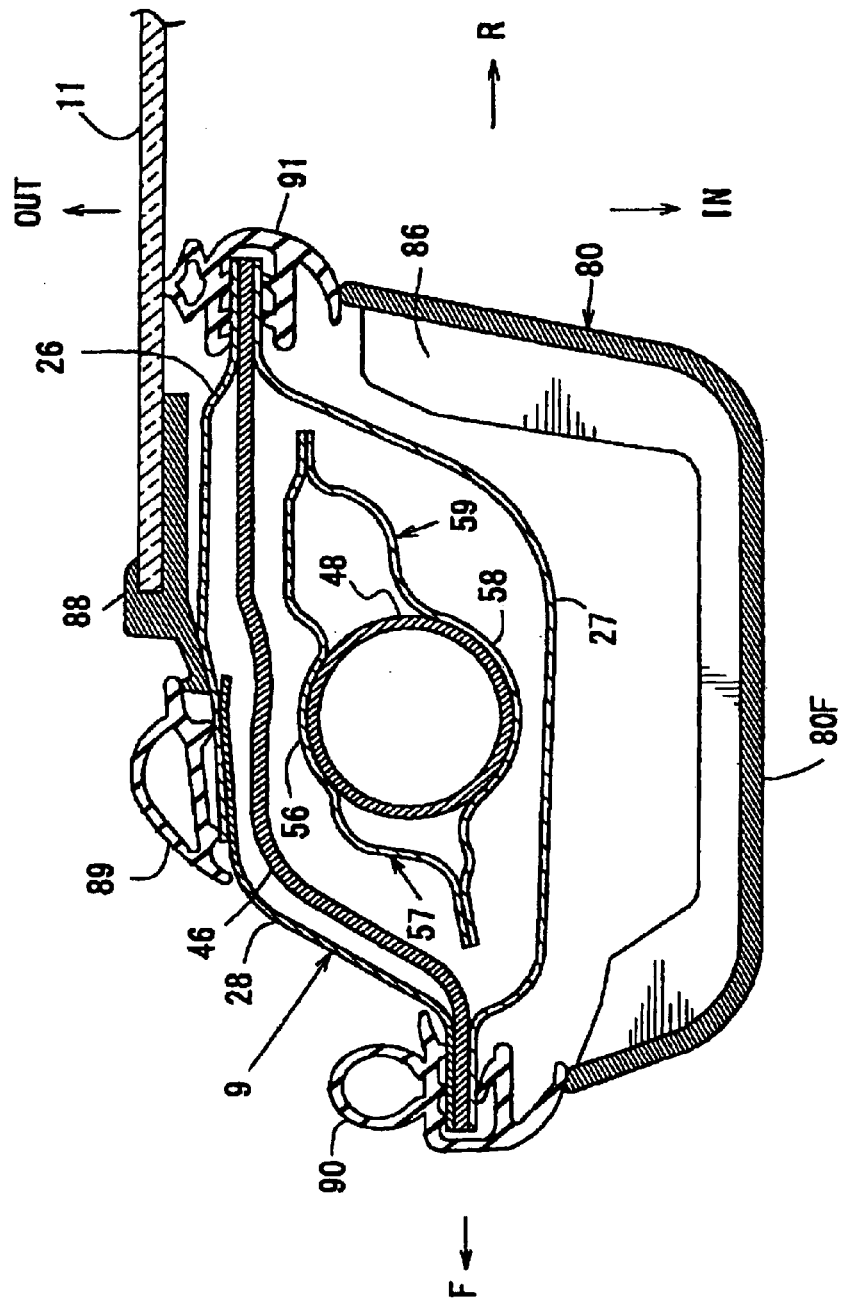
FIG. 19 is a sectional view showing an impact absorbing structure according to another embodiment of the present invention.
Figure 20:
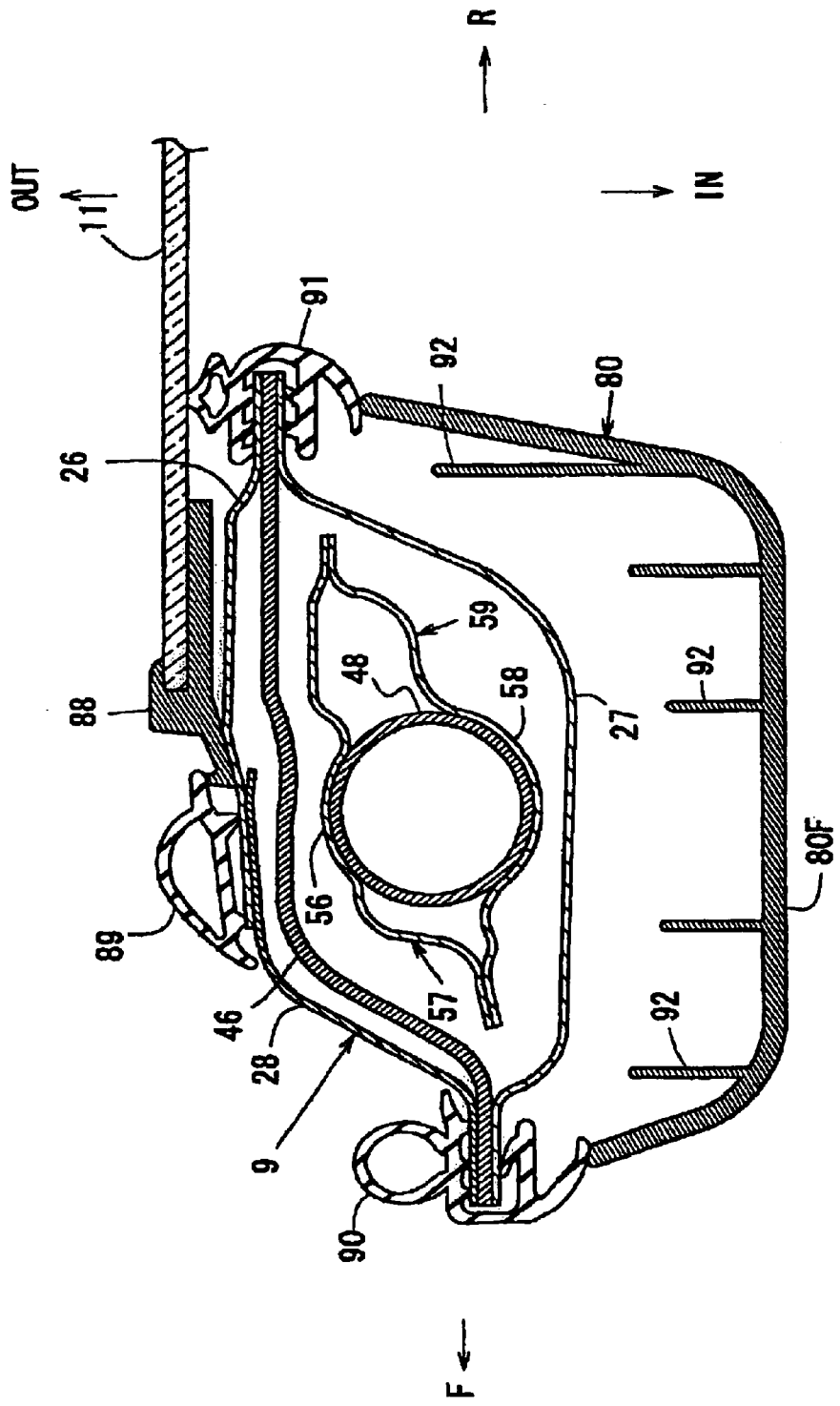
FIG. 20 is a sectional view showing an impact absorbing structure according to still another embodiment of the present invention.

FIG. 19 and FIG. 20 show an impact absorbing structure for a vehicle side door according to other embodiments of the present invention. According to the embodiment of FIG. 19, a substantially concave rib 86 is united to the front longitudinal-side part 80F of the upper trim 80. This rib 86 is designed not to be divided into front and rear parts.

According to the embodiment of FIG. 20, a plurality of ribs 92 . . . which extend in a substantially up-and-down directions are united to the upper trim 80. Each rib 92 . . . is placed at predetermined intervals in the front-and-rear directions along the front longitudinal-side part 80F of the upper trim 80.

In the impact absorbing structure for the vehicle side door according to these embodiments shown in FIG. 19 and FIG. 20, other constitution, operation and advantages are the same as those according to the embodiment mentioned previously. Therefore, in FIG. 19 and FIG. 20, the same reference numerals and characters are used as those in the previous figures, and their detailed description is omitted.

With respect to the correspondence of the constitution according to the present invention to the aforementioned embodiments, the opening formed in the side part of the vehicle according to the present invention corresponds to the door opening portion 15 with no center pillar according to the embodiments. In the same way, the side door corresponds to the rear door 3: the door window member; the flip window member 11: the sash-side door trim; the upper trim 80: the impact absorbing portion; the ribs 86: and the door main body-side door trim; the lower trim 79. However, the present invention is not limited only to the constitution according to the aforementioned embodiments.

In the impact absorbing structure for the vehicle side door according to the present invention, the side door includes a door main body and a door sash portion, a sash-side door trim is provided in the door sash portion on the inside of a vehicle cabin, and an impact absorbing portion which absorbs an impact load when an occupant comes into contact with the sash-side door trim from the inside of the vehicle cabin is provided in a front longitudinal-side part of the sash-side door trim. Therefore, this impact absorbing structure for the vehicle side door takes advantage of the fact that the absorption of an impact on an occupant can be secured, thus the occupant can be kept safer, and the structure can be made simpler by providing the impact absorbing portion in the sash-side door trim.

In summary, an impact absorbing structure for a vehicle side door according to the present invention, the side door opening and closing an opening formed in a side part of a vehicle and including: a door main body which has a door inner panel and a door outer panel joined to said door inner panel; and a door sash portion which extends upward from said door main body and supports a door window member, wherein: a sash-side door trim which covers said door sash portion is provided in the door sash portion on the inside of a vehicle cabin; and an impact absorbing portion which absorbs an impact load when an occupant comes into contact with said sash-side door trim from the inside of the vehicle cabin is provided in a front longitudinal-side part of the sash-side door trim.

The side door having the above described configuration may also be a rear door, and the impact absorbing portion may also be formed by a rib which is disposed inside the front longitudinal-side part.

According to the above described configuration, the impact absorbing portion is provided in the front longitudinal-side part of the sash-side door trim. Thereby, if an occupant comes into contact with the sash-side door trim from the inside of the vehicle cabin when the vehicle is bumped at its side part, the absorption of an impact on the occupant can be secured, keeping the occupant safer. In addition, the impact absorbing portion which absorbs an impact load is provided in the sash-side door trim, allowing the structure to become simpler.

According to an implementation of the present invention, a door main body-side door trim is provided below said sash-side door trim, and said door main body-side door trim covers said door main body on the inside of the vehicle cabin.

According to this configuration, the sash side and the door main-body side can each be upholstered with a trim. In addition, each of the sash-side door trim and the door main body-side door trim can be configured separately. In this case, those trims can be made of respective materials.

According to another implementation of the present invention, said sash-side door trim is made of an impact-absorbable hard material, and said door main body-side door trim is made of a soft material.

According to this configuration, the sash-side door trim made of a hard material can be aimed at absorbing an impact; the door main body-side door trim made of a soft material, improving the feel of a material.

According to still another implementation of the present invention, a vertical reinforcement is provided between said door inner panel and said door outer panel of the side door, and said vertical reinforcement extends in the up-and-down directions along a front longitudinal-side part of the side door; and said impact absorbing portion in said sash-side door trim is disposed in a position on the inside of the vehicle cabin which corresponds to said vertical reinforcement.

According to this configuration, the impact absorbing portion is provided correspondingly to the vertical reinforcement having a great rigidity, enhancing the absorption of an impact on the occupant. In other words, an impact can be absorbed with making the door and the vehicle body more rigid.

According to still another implementation of the present invention, the side door is supported on a hinge at a rear part thereof.

According to this configuration, the side door can be opened and closed on a fulcrum at its rear part.

According to still another implementation of the present invention, the side door is a rear door of the door which has a double-leafed hinged structure, and the rear door, together with a front door supported on a hinge at a front part thereof, opens and closes the continuous opening formed in the side part of the vehicle.

According to this configuration, in a double-leafed hinged door with no center pillar, there is the sash-side door trim including the impact absorbing portion at the door sash portion on the inside of the vehicle cabin of the rear door. Thereby, the absorption of an impact on an occupant can be secured.

According to still another implementation of the present invention, a part at which the impact absorbing portion is disposed in the sash-side door trim of the rear door, juts out from an inner surface of the front door on the inside of the vehicle cabin toward the inside of the vehicle cabin.

According to this configuration, the part (or the front longitudinal-side part) at which the impact absorbing portion is disposed in the sash-side door trim, juts out toward the inside of the vehicle cabin. Thereby, when the vehicle is bumped at its side part, an occupant, or particularly, the head of a front-seat occupant, comes into contact, first of all, with the sash-side door trim. This allows the absorption of an impact to be made sufficient.

This application is based on Japanese patent application No. 2002-302621, filed in Japan Patent Office on Oct. 17, 2002, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An impact absorbing structure for a vehicle side door which opens and closes an opening formed in a side part of a vehicle, the side door including a door main body which has a door inner panel and a door outer panel joined to said door inner panel; and a door sash portion which extends upward from said door main body and supports a door window member, said impact absorbing structure comprising:
 a sash-side door trim, which covers said door sash portions, is provided in the door sash portion on the inside of a vehicle cabin; and
 an impact absorbing portion, which absorbs an impact load in response to contact with said sash-side door trim from the inside of the vehicle cabin, is provided in a front longitudinal-side part of the sash-side door trim.

2. The impact absorbing structure according to claim 1, wherein a door main body-side door trim is provided below said sash-side door trim, and said door main body-side door trim covers said door main body on the inside of the vehicle cabin.

3. The impact absorbing structure according to claim 2, wherein said sash-side door trim is made of an impact-absorbable hard material, and said door main body-side door trim is made of a soft material.

4. The impact absorbing structure according to claim 1, wherein:
 a vertical reinforcement is provided between said door inner panel and said door outer panel of the side door, and said vertical reinforcement extends in the up-and-don directions along a front longitudinal-side part of the side door; and
 said impact absorbing portion in said sash-side door trim is disposed in a position on the inside of the vehicle cabin which corresponds to said vertical reinforcement.

5. The impact absorbing structure according to claim 1, wherein the side door is supported on a hinge at a rear part thereof.

6. The impact absorbing structure according to claim 5, wherein the side door is a rear door of the door which has a double-leafed hinged structure, and the rear door, together with a front door supported on a binge at a front part thereof, opens and closes the opening formed in the side part of the vehicle.

7. The impact absorbing structure according to claim 6, wherein a part at which said impact absorbing portion is disposed in said sash-side door trim of the rear door, juts out from an inner surface of the front door on the inside of the vehicle cabin toward the inside of the vehicle cabin.

8. An impact absorbing structure for a vehicle side door which opens and closes an impact absorbing structure for a vehicle side door which opens and closes an opening formed in a side part of a vehicle, the side door including a door main body which has a door inner panel and a door outer panel joined to said door inner panel; and a door sash portion which extends upward from said door main body and supports a door window member, said impact absorbing structure comprising:
 a sash-side door trim which covers said door sash portion is provided in the door sash portion on the inside of a vehicle cabin; and an impact absorbing portion, which absorbs an impact load in response to contact with said sash-side door trim from the inside of the vehicle cabin, is provide in a portion of the sash-side door trim, said portion corresponds to a frontal and substantially vertically extended portion of the sash-side door trim.

* * * * *